(12) United States Patent
Li et al.

(10) Patent No.: US 11,589,274 B2
(45) Date of Patent: *Feb. 21, 2023

(54) SECURITY PROTECTION METHOD, APPARATUS, AND SYSTEM

(71) Applicant: HUAWEI TECHNOLOGIES CO., LTD., Guangdong (CN)

(72) Inventors: He Li, Shanghai (CN); Jing Chen, Shanghai (CN)

(73) Assignee: Huawei Technologies Co., Ltd., Guangdong (CN)

(*) Notice: Subject to any disclaimer, the term of this patent is extended or adjusted under 35 U.S.C. 154(b) by 64 days.

This patent is subject to a terminal disclaimer.

(21) Appl. No.: 17/190,740

(22) Filed: Mar. 3, 2021

(65) Prior Publication Data
US 2021/0266799 A1   Aug. 26, 2021

Related U.S. Application Data

(63) Continuation of application No. 16/731,994, filed on Dec. 31, 2019, now Pat. No. 10,952,106, which is a (Continued)

(30) Foreign Application Priority Data

Sep. 30, 2017 (CN) .......................... 201710945254.4

(51) Int. Cl.
*H04W 36/00* (2009.01)
*H04W 8/08* (2009.01)
(Continued)

(52) U.S. Cl.
CPC .......... *H04W 36/0038* (2013.01); *H04L 9/08* (2013.01); *H04W 8/08* (2013.01); *H04W 12/033* (2021.01);
(Continued)

(58) Field of Classification Search
CPC .... H04L 9/08; H04W 12/0013; H04W 12/04; H04W 12/0407; H04W 12/04071;
(Continued)

(56) References Cited

U.S. PATENT DOCUMENTS 8,949,927 B2 * 2/2015 Arnott ............... H04L 63/20
380/255
2002/0090186 A1  7/2002 Sillard et al.
(Continued)

FOREIGN PATENT DOCUMENTS

CN   101072092   11/2007
CN   101262337    9/2008
(Continued)

OTHER PUBLICATIONS

3GPP TR 33.899 V1.3.0 (Aug. 2017), "3rd Generation Partnership Project;Technical Specification Group Services and System Aspects;Study on the security aspects of the next generation system(Release 14)," Aug. 2017, 604 pages.
(Continued)

*Primary Examiner* — Pao Sinkantarakorn
(74) *Attorney, Agent, or Firm* — Fish & Richardson P.C.

(57) ABSTRACT

This application relates to the field of wireless communications technologies. Embodiments of this application provide a security protection method, an apparatus, and a system, to resolve a problem of low efficiency in handing over a terminal between serving base stations. The method in this application includes: receiving, by a target access network device, a correspondence between user plane information and a security policy from a source access network device; and determining, by the target access network device based on the correspondence between user plane information and a security policy, a first user plane protection algorithm corresponding to the user plane information, where the first
(Continued)

user plane protection algorithm includes one or both of a user plane encryption algorithm and a user plane integrity protection algorithm. This application is applicable to a procedure in which the terminal is handed over between serving base stations.

27 Claims, 15 Drawing Sheets

Related U.S. Application Data continuation of application No. PCT/CN2018/108904, filed on Sep. 29, 2018.

(51) Int. Cl.
| | |
|---|---|
| *H04W 48/16* | (2009.01) |
| *H04W 80/10* | (2009.01) |
| *H04L 9/08* | (2006.01) |
| *H04W 12/033* | (2021.01) |
| *H04W 12/106* | (2021.01) |

(52) U.S. Cl.
CPC ......... *H04W 12/106* (2021.01); *H04W 48/16* (2013.01); *H04W 80/10* (2013.01)

(58) Field of Classification Search
CPC ......... H04W 36/0011; H04W 36/0016; H04W 36/0033; H04W 36/0038
See application file for complete search history.

(56) References Cited

U.S. PATENT DOCUMENTS

| | | | |
|---|---|---|---|
| 2012/0308007 | A1 | 12/2012 | Li et al. |
| 2013/0091485 | A1 | 4/2013 | Colombo et al. |
| 2019/0014509 | A1* | 1/2019 | Nakarmi ........... H04W 12/0433 |
| 2019/0182737 | A1 | 6/2019 | Futaki et al. |
| 2019/0394651 | A1* | 12/2019 | Wifvesson ............ H04W 12/10 |
| 2020/0120499 | A1* | 4/2020 | Norrman ............... H04L 63/061 |

FOREIGN PATENT DOCUMENTS

| | | |
|---|---|---|
| CN | 102137400 | 7/2011 |
| CN | 102264064 | 11/2011 |
| CN | 106851856 | 6/2017 |
| CN | 107018542 | 8/2017 |
| CN | 107079023 | 8/2017 |
| EP | 2083602 | 7/2014 |
| EP | 3145246 | 3/2017 |
| KR | 20090044316 | 5/2009 |

OTHER PUBLICATIONS

Office Action issued in Japanese Application No. 2020-518431 dated Aug. 3, 2021, 5 pages (with English translation).
3GPP TS 23.502 V1.2.0 (Sep. 2017), "3rd Generation Partnership Project; Technical Specification Group Services and System Aspects; Procedures for the 5G System; Stage 2 (Release 15)," Sep. 2017, 165 pages.
3GPP TS 33.401 V14.4.0 (Sep. 2017), "3rd Generation Partnership Project;Technical Specification Group Services and System Aspects; 3GPP System Architecture Evolution (SAE); Security architecture (Release 14)," Sep. 2017, 153 pages.
3GPP TS 33.401 V15.1.0 (Sep. 2017), "3rd Generation Partnership Project;Technical Specification Group Services and System Aspects; 3GPP System Architecture Evolution (SAE); Security architecture (Release 15)," Sep. 2017, 161 pages.
3GPP TS 33.501 V0.3.0 (Aug. 2017), "3rd Generation Partnership Project;Technical Specification Group Services and System Aspects; Security Architecture and Procedures for 5G System (Release 15)," Aug. 2017, 44 pages.
3GPP TS 38.423 V0.3.0 (Aug. 2017), "3rd Generation Partnership Project;Technical Specification Group Radio Access Network; NG Radio Access Network(NG-RAN); Xn application protocol (XnAP) (Release 15)," Aug. 2017, 62 pages.
Extended European Search Report issued in European Application No. 18860710.5 dated Sep. 15, 2020, 10 pages.
NEC, "pCR to TR 33.899: Intra AMF, Inter SMF, Inter NG RAN handover without Xn interface," 3GPP TSG SA WG3 (Security) Meeting #87, Ljubljana, S3-171180, May 15-19, 2017, 3 pages.
Office Action issued in Chinese Application No. 201811344893.6 dated Jun. 9, 2019, 9 pages.
Office Action issued in Chinese Application No. 201811345688.1 dated Aug. 24, 2020, 10 pages (with English translation).
PCT International Search Report and Written Opinion issued in International Application No. PCT/CN2018/108904 dated Nov. 28, 2018, 19 pages (with English translation).
3GPP TS 23.501 V1.4.0 (Sep. 2017), "3rd Generation Partnership Project; Technical Specification Group Services and System Aspects; System Architecture for the 5G System;Stage 2(Release 15)," Sep. 2017, 151 pages.
3GPP TS 23.503 V0.3.0 (Sep. 2017), "3rd Generation Partnership Project; Technical Specification Group Services and System Aspects; Policy and Charging Control Framework for the 5G System; Stage 2(Release 15)," Sep. 2017, 27 pages.
3GPP TS 38.413 V0.3.0 (Aug. 2017), "3rd Generation Partnership Project; Technical Specification Group Radio Access Network; NG Radio Access Network (NG-RAN); NG Application Protocol (NGAP)(Release 15)," Aug. 2017, 85 pages.

* cited by examiner

SECURITY PROTECTION METHOD, APPARATUS, AND SYSTEM

CROSS-REFERENCE TO RELATED APPLICATIONS

This application is a continuation of U.S. patent application Ser. No. 16/731,994, filed on Dec. 31, 2019, which is a continuation of International Application No. PCT/CN2018/108904, filed on Sep. 29, 2018. The International Application claims priority to Chinese Patent Application No. 201710945254.4, filed on Sep. 30, 2017. All of the aforementioned patent applications are hereby incorporated by reference in their entireties.

TECHNICAL FIELD

This application relates to the field of wireless communications technologies, and in particular, to a security protection method, an apparatus, and a system.

BACKGROUND

In a communications system, if a terminal rapidly moves out of a service range of a base station serving the terminal, to ensure session continuity of the terminal (for example, to ensure that a service being performed by the terminal is not interrupted), a source base station initiates a handover procedure of the terminal, so that a serving base station of the terminal is switched from the source base station to a target base station, and the target base station continues to support the service being performed by the terminal.

In the handover procedure of the terminal, a handover request sent by the source base station to the target base station includes a terminal security capability and a key in evolved NodeB (KeNB*) in the handover process of the terminal. The target base station may determine a signaling plane encryption algorithm, a signaling plane integrity protection algorithm, and a user plane encryption algorithm based on the received terminal security capability and the received KeNB*, and the target base station respectively generates a signaling plane encryption key, a signaling plane integrity protection key, and a user plane encryption key. Then the target base station sends a handover command message to the terminal via the source base station, and the handover command message carries the signaling plane encryption algorithm, the signaling plane integrity protection algorithm, and the user plane encryption algorithm that are determined by the target base station. Then the terminal generates the signaling plane encryption key, the signaling plane integrity protection key, and the user plane encryption key according to the algorithms carried in the handover command message. The terminal further encrypts a handover confirm message by using the signaling plane encryption key and the signaling plane integrity protection key, and sends the encrypted handover confirm message to the target base station.

In the handover procedure of the terminal, the target base station determines the signaling plane encryption algorithm, the signaling plane integrity protection algorithm, and the user plane encryption algorithm regardless of whether signaling plane security protection and user plane security protection need to be performed, increasing overheads of the target base station, and increasing a time for the target base station to prepare for handover of the terminal. Consequently, handover efficiency of the terminal is reduced.

SUMMARY

Embodiments of this application provide a security protection method, an apparatus, and a system, to resolve a problem of low efficiency in handover of a terminal between serving base stations.

To achieve the foregoing objectives, the following technical solutions are used in the embodiments of this application:

According to a first aspect, an embodiment of this application provides a security protection method, where the method includes: receiving, by a first access network device from a second access network device, a correspondence between user plane information and a security policy; and then determining, by the first access network device based on the correspondence, a first user plane protection algorithm corresponding to the user plane information, where the first user plane protection algorithm includes one or both of a user plane encryption algorithm and a user plane integrity protection algorithm. In the solution of this embodiment of this application, the first access network device may determine only a user plane protection algorithm, and does not need to enable signaling plane protection, thereby reducing network overheads. Further, if the solution is applied to a scenario in which a terminal is handed over, a time for the first access network device to prepare for handover of the terminal can be reduced, thereby improving handover efficiency of the terminal.

The user plane information may include any one or more of the following information: a PDU session identifier, a QoS parameter, and a slice parameter.

A representation form of the correspondence between user plane information and a security policy may be a combination of user plane information and a security policy that are in a correspondence. A plurality of pieces of user plane information may be corresponding to a plurality of security policies by using one correspondence. For example, in a correspondence between a plurality of pieces user plane information and a plurality of security policies, the user plane information includes a PDU session identifier and a QoS parameter, and the security policies includes a security policy 1 and a security policy 2. Alternatively, one piece of user plane information is corresponding to one security policy by using one correspondence. For example, a correspondence between user plane information and a security policy is a combination of one QoS parameter and one security policy.

In an example, the correspondence between user plane information and a security policy may be {PDU session ID=1, NIA=1, NEA=2}, and this indicates that, for a session whose PDU session identifier is 1, a user plane integrity protection algorithm 1 is used to perform user plane integrity protection, and a user plane encryption algorithm 2 is used to perform user plane encryption protection.

Optionally, the solution of this embodiment of this application may be applied to a process in which the terminal is handed over between serving base stations. The first access network device may be a TgNB, and the second access network device may be an SgNB. In the process in which the terminal is handed over between serving base stations, the first access network device may determine only a user plane protection algorithm, and does not need to activate signaling plane protection, reducing network overheads, and saving a time for the first access network device to prepare for handover of the terminal, thereby improving handover efficiency of the terminal.

In a possible design, the first access network device determines the first user plane protection algorithm as a signaling plane protection algorithm.

In another possible design, the first access network device determines a signaling plane protection algorithm, where the signaling plane protection algorithm includes one or both of a signaling plane encryption algorithm and a signaling plane integrity protection algorithm.

In a possible design, the first access network device sends first indication information to a terminal via the second access network device, where the first indication information is used to indicate that the first user plane protection algorithm is the same as the signaling plane protection algorithm, or the first indication information is used to indicate an identifier of the signaling plane protection algorithm determined by the first access network device.

According to the solution of this embodiment of this application, the first access network device notifies the terminal of an available signaling plane protection algorithm after determining the signaling plane protection algorithm, so that the terminal activates signaling plane security protection in a timely manner, to perform security protection on a signaling plane message, and ensure security of the signaling plane message.

In a possible design, the security policy is used to indicate a security protection type for activation, the security protection type includes one or both of user plane encryption protection and user plane integrity protection, and a method for determining, by the first access network device based on the correspondence between user plane information and a security policy, a first user plane protection algorithm corresponding to the user plane information is: determining, by the first access network device, the first user plane protection algorithm corresponding to the security protection type for activation that is indicated by the security policy.

Each security protection type is corresponding to one algorithm set. In an implementation, the first access network device stores a user plane encryption algorithm set and a user plane integrity protection algorithm set. The first access network device neither distinguishes between the user plane encryption algorithm and the signaling plane encryption algorithm nor distinguishes between the user plane integrity protection algorithm and the signaling plane integrity protection algorithm. In other words, the user plane encryption algorithm set may also be used as a signaling plane encryption algorithm set, and the user plane integrity protection algorithm set may also be used as a signaling plane integrity protection algorithm set. In another implementation, the first access network device distinguishes between the user plane encryption algorithm and the signaling plane encryption algorithm, and distinguishes between the user plane integrity protection algorithm and the signaling plane integrity protection algorithm. The first access network device stores a user plane encryption algorithm set, a user plane integrity protection algorithm set, a signaling plane encryption algorithm set, and a signaling plane integrity protection algorithm set. All the foregoing algorithm sets may exist in a form of a priority list, and algorithms in the priority list are arranged in descending order of priorities.

In another possible design, the security policy includes a user plane protection algorithm identifier, and a method for determining, by the first access network device based on the correspondence between user plane information and a security policy, a first user plane protection algorithm corresponding to the user plane information is specifically: determining, by the first access network device, a second user plane protection algorithm corresponding to the user plane protection algorithm identifier; and if both the first access network device and the terminal support the second user plane protection algorithm, determining, by the first access network device, the second user plane protection algorithm as the first user plane protection algorithm; or if either of the first access network device or the terminal does not support the second user plane protection algorithm, selecting, by the first access network device from a security algorithm set corresponding to a security protection type to which the second user plane protection algorithm belongs, a user plane protection algorithm supported by both the first access network device and the terminal as the first user plane protection algorithm.

Optionally, the security algorithm set corresponding to the security protection type may exist in a form of a priority list, and algorithms in the priority list are arranged in descending order of priorities.

Optionally, the first access network device may receive a terminal security capability from the second access network device, and the terminal security capability includes a user plane protection algorithm supported by the terminal. The first access network device may select, from a security algorithm set corresponding to a security protection type to which the second user plane protection algorithm belongs, a user plane protection algorithm that is supported by the terminal and that has a highest priority.

In a possible design, the first access network device generates a user plane protection key according to the first user plane protection algorithm, where the user plane protection key includes one or both of a user plane encryption key and a user plane integrity protection key.

In a possible design, the first access network device generates a signaling plane protection key according to the signaling plane protection algorithm, where the signaling plane protection key includes one or both of a signaling plane encryption key and a signaling plane integrity protection key.

In a possible design, the first access network device sends, to the terminal via the second access network device, a first message protected by using the user plane integrity protection key or the signaling plane integrity protection key, where the first message includes the first user plane protection algorithm.

Optionally, the first message may further carry a signaling plane protection algorithm if the first access network device has determined the signaling plane protection algorithm.

In a possible design, the first access network device receives, from the terminal, a second message protected by using the user plane protection key or the signaling plane protection key, where the second message is a response message of the first message.

In a possible design, the method further includes: sending, by the first access network device, the correspondence between user plane information and a security policy to an Access and Mobility Management Function AMF node; receiving, by the first access network device, one or both of second indication information and a security policy from the AMF node, where the second indication information is used to indicate whether a security policy from the second access network device can be used; and redetermining the first user plane protection algorithm and the user plane protection key according to the security policy from the AMF node if the first access network device receives the security policy from the AMF node, and the security policy from the AMF node is different from the security policy from the second access network device; or redetermining, by the first access network device, the first user plane protection algorithm and the user plane protection key according to a default security policy if the first access network device receives the second indication information from the AMF node and receives no security policy from the AMF node, and the second indication information indicates that the first access network device cannot use the security policy from the second access network device.

According to the solution provided in this embodiment of this application, the first access network device may verify a currently used security policy, to obtain a security policy applicable to a resource status of the first access network device. If the second access network device is cracked by an attacker, and sends, to the first access network device, a security policy of a reduced security level, a security capability level of a user plane protection algorithm determined by the first access network device according to the security policy is relatively lower, and information protected by using the user plane protection algorithm can be easily cracked. Therefore, the first access network device uses the security policy delivered by the AMF node, so that this vulnerability can be avoided, and security can be further improved.

According to a second aspect, an embodiment of this application provides a security protection method, where the method includes: obtaining, by a second access network device, a correspondence between user plane information and a security policy; and sending, by the second access network device, the correspondence between user plane information and a security policy to a first access network device.

According to a third aspect, an embodiment of this application provides a security protection method, where the method includes: receiving, by an Access and Mobility Management Function AMF node, user plane information from a second access network device; then sending, by the AMF node, the user plane information to a Session Management Function SMF node; receiving, by the AMF node, a security policy that is corresponding to the user plane information and that is from the SMF node; and sending, by the AMF node, the security policy corresponding to the user plane information to a first access network device.

According to the solution of this embodiment of this application, when there is no communications interface between the second access network device and the first access network device, the second access network device may trigger the AMF node and the SMF node to provide a correspondence between user plane information and a security policy for the second access network device, so that a terminal may be handed over to the second access network device.

According to a fourth aspect, an embodiment of this application provides a security protection method, where the method includes: receiving, by a Session Management Function SMF node, user plane information from an Access and Mobility Management Function AMF node; determining, by the SMF node, a security policy corresponding to the user plane information; sending, by the SMF node, the security policy corresponding to the user plane information to a first access network device via the AMF node.

According to the solution provided in this embodiment of this application, the SMF node may provide a security policy applicable to a resource status of the first access network device via the AMF node. If the second access network device is cracked by an attacker, and sends, to the first access network device, a security policy of reducing a security level, a security capability level of a user plane protection algorithm determined by the first access network device according to the security policy is relatively low, and information protected by using the user plane protection algorithm can be easily cracked. Therefore, the first access network device uses the security policy delivered by the AMF node, so that this vulnerability can be avoided, and security can be further improved.

According to a fifth aspect, an embodiment of this application provides an apparatus, where the apparatus has a function of implementing actions of the first access network device in the foregoing method designs. The function may be implemented by hardware, or may be implemented by hardware executing corresponding software. The hardware or software includes one or more modules corresponding to the foregoing function. For example, the apparatus may be the first access network device, or may be a chip in the first access network device.

In a possible design, the apparatus is the first access network device. The first access network device includes a processor, and the processor is configured to support the first access network device in performing a corresponding function in the foregoing methods. Further, the first access network device may include a communications interface, and the communications interface is configured to support communication between the first access network device and a second access network device or an AMF node. Further, the first access network device may include a transceiver. The transceiver is configured to support communication between the first access network device and a terminal. Further, the first access network device may include a memory. The memory is configured to be coupled to the processor, and store a program instruction and data that are necessary for the first access network device.

According to a sixth aspect, an embodiment of this application provides an apparatus, where the apparatus has a function of implementing actions of the second access network device in the foregoing method designs. The function may be implemented by hardware, or may be implemented by hardware executing corresponding software. The hardware or software includes one or more modules corresponding to the foregoing function. For example, the apparatus may be the second access network device, or may be a chip in the second access network device.

In a possible design, the apparatus is the second access network device. The second access network device includes a processor, and the processor is configured to support the second access network device in performing a corresponding function in the foregoing methods. Further, the second access network device may include a communications interface, a transmitter, and a receiver. The communications interface is configured to support communication between the second access network device and a first access network device or an AMF node, and the transmitter and the receiver are configured to support communication between the second access network device and a terminal. Further, the second access network device may include a transceiver. The transceiver is configured to support communication between the second access network device and the terminal. Further, the second access network device may include a memory. The memory is configured to be coupled to the processor, and store a program instruction and data that are necessary for the second access network device.

According to a seventh aspect, an embodiment of this application provides an apparatus, where the apparatus has a function of implementing actions of the AMF node in the foregoing method designs. The function may be implemented by hardware, or may be implemented by hardware executing corresponding software. The hardware or software includes one or more modules corresponding to the foregoing function. For example, the apparatus may be the AMF node, or may be a chip in the AMF node.

In a possible design, the apparatus is the AMF node. The AMF node includes a processor, and the processor is configured to support the AMF node in performing a corresponding function in the foregoing methods. Further, the AMF node may include a communications interface. The communications interface is configured to support communication between the AMF node and a first access network device, a second access network device, or an SMF node. Further, the AMF node may include a memory. The memory is configured to be coupled to the processor, and store a program instruction and data that are necessary for the AMF node.

According to an eighth aspect, an embodiment of this application provides an apparatus, where the apparatus has a function of implementing actions of the SMF node in the foregoing method designs. The function may be implemented by hardware, or may be implemented by hardware executing corresponding software. The hardware or software includes one or more modules corresponding to the foregoing function. For example, the apparatus may be the SMF node, or may be a chip in the SMF node.

In a possible design, the apparatus is the SMF node. The SMF node includes a processor, and the processor is configured to support the SMF node in performing a corresponding function in the foregoing methods. Further, the SMF node may include a communications interface. The communications interface is configured to support communication between the SMF node and an AMF node. Further, the SMF node may include a memory. The memory is configured to be coupled to the processor, and store a program instruction and data that are necessary for the SMF node.

According to an ninth aspect, an embodiment of this application provides an apparatus, where the apparatus has a function of implementing actions of the terminal in the foregoing method designs. The function may be implemented by hardware, or may be implemented by hardware executing corresponding software. The hardware or software includes one or more modules corresponding to the foregoing function. For example, the apparatus may be the terminal, or may be a chip in the terminal.

In a possible design, the apparatus is the terminal. The terminal includes a processor, and the processor is configured to support the terminal in performing a corresponding function in the foregoing methods. Further, the terminal may include a transmitter and a receiver. The transmitter and the receiver are configured to support communication between the terminal and an access network device. Further, the terminal may include a memory. The memory is configured to be coupled to the processor, and store a program instruction and data that are necessary for the terminal.

According to a tenth aspect, an embodiment of this application provides a communications system, where the system includes the first access network device and the second access network device according to the foregoing aspects; or the system includes the first access network device, the second access network device, and the AMF node according to the foregoing aspects; or the system includes the first access network device, the second access network device, the AMF node, and the SMF node according to the foregoing aspects; or the system includes the first access network device, the second access network device, the AMF node, the SMF node, and the terminal according to the foregoing aspects.

According to a eleventh aspect, an embodiment of this application provides a computer storage medium, configured to store a computer software instruction used by the foregoing first access network device, where the computer software instruction includes a program designed for performing the foregoing aspects.

According to an twelfth aspect, an embodiment of this application provides a computer storage medium, configured to store a computer software instruction used by the foregoing second access network device, where the computer software instruction includes a program designed for performing the foregoing aspects.

According to a thirteenth aspect, an embodiment of this application provides a computer storage medium, configured to store a computer software instruction used by the foregoing AMF node, where the computer software instruction includes a program designed for performing the foregoing aspects.

According to a fourteenth aspect, an embodiment of this application provides a computer storage medium, configured to store a computer software instruction used by the foregoing SMF node, where the computer software instruction includes a program designed for performing the foregoing aspects.

According to a fifteenth aspect, an embodiment of this application provides a computer storage medium, configured to store a computer software instruction used by the foregoing terminal, where the computer software instruction includes a program designed for performing the foregoing aspects.

According to a sixteenth aspect, an embodiment of this application provides a computer program product including an instruction, where a computer is enabled to perform the method in the first aspect when the computer program product runs on the computer.

According to a seventeenth aspect, an embodiment of this application provides a computer program product including an instruction, where a computer is enabled to perform the method in the second aspect when the computer program product runs on the computer.

According to a eighteenth aspect, an embodiment of this application provides a computer program product including an instruction, where a computer is enabled to perform the method in the third aspect when the computer program product runs on the computer.

According to an nineteenth aspect, an embodiment of this application provides a computer program product including an instruction, where a computer is enabled to perform the method in the fourth aspect when the computer program product runs on the computer.

According to a twentieth aspect, an embodiment of this application provides a chip system, where the chip system is applied to a first access network device, the chip system includes at least one processor, a memory, and an interface circuit, the memory, the interface circuit, and the at least one processor are connected to each other by using a line, the memory stores an instruction, and the processor executes the instruction, to perform an operation of the first access network device in the method in the first aspect.

According to a twenty-first aspect, an embodiment of this application provides a chip system, where the chip system is applied to a second access network device, the chip system includes at least one processor, a memory, and an interface circuit, the memory, the interface circuit, and the at least one processor are connected to each other by using a line, the memory stores an instruction, and the processor executes the instruction, to perform an operation of the second access network device in the method in the second aspect.

According to a twenty-second aspect, an embodiment of this application provides a chip system, where the chip system is applied to an AMF node, the chip system includes at least one processor, a memory, and an interface circuit, the memory, the interface circuit, and the at least one processor are connected to each other by using a line, the memory stores an instruction, and the processor executes the instruction, to perform an operation of the AMF node in the method in the third aspect.

According to a twenty-third aspect, an embodiment of this application provides a chip system, where the chip system is applied to an SMF node, the chip system includes at least one processor, a memory, and an interface circuit, the memory, the interface circuit, and the at least one processor are connected to each other by using a line, the memory stores an instruction, and the processor executes the instruction, to perform an operation of the SMF node in the method in the fourth aspect.

In comparison with the prior art, in the solutions of the embodiments of this application, in a handover process of the terminal, the first access network device may determine only a user plane protection algorithm, and does not need to enable signaling plane protection, reducing network overheads, saving a time for the first access network device to prepare for handover of the terminal, thereby improving handover efficiency of the terminal.

DESCRIPTION OF EMBODIMENTS

The following further describes this application in detail with reference to accompanying drawings. A specific operation method in method embodiments may also be applied to an apparatus embodiment or a system embodiment. In descriptions of this application, unless otherwise specified. "a plurality of" means two or more than two.

A system architecture and a service scenario described in this application are intended to more clearly describe the technical solutions in this application, but are not intended to limit the technical solutions provided in this application. A person of ordinary skill in the art may know that as the system architecture evolves and a new service scenario emerges, the technical solutions provided in this application are also applicable to a similar technical problem.

It should be noted that, in this application, a term such as "example" or "for example" is used to represent giving an example, an illustration, or a description. Any embodiment or design solution described as an "example" or "for example" in this application should not be explained as being more preferred or having more advantages than another embodiment or design solution. Exactly, use of the term such as "example" or "for example" is intended to present a related concept in a specific manner.

Figure 1:
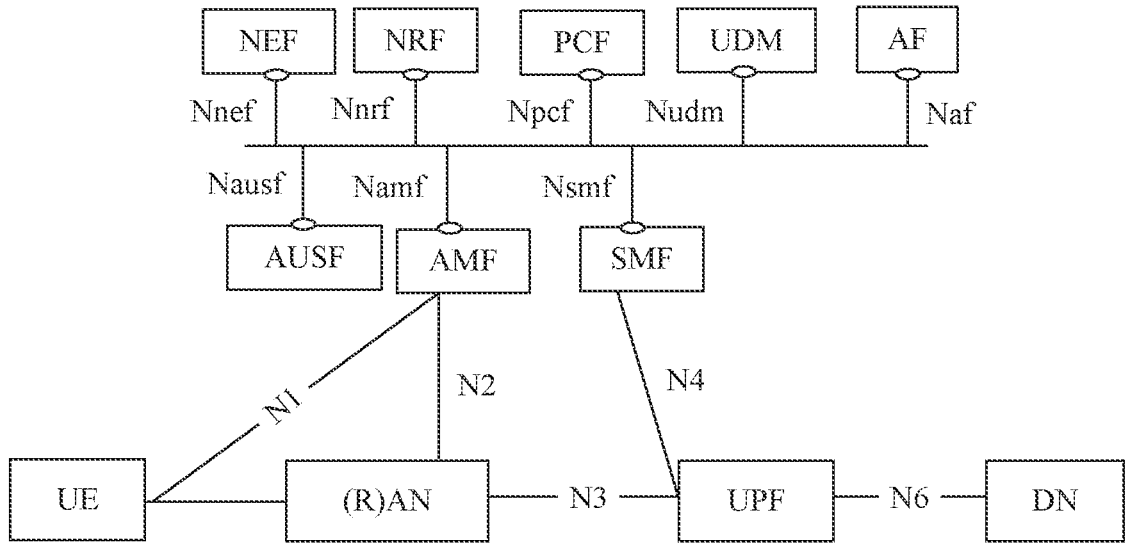
FIG. 1 is a schematic diagram of a possible network architecture according to an embodiment of this application.

Embodiments of this application may be applied to a next-generation wireless communications system, for example, a 5G communications system. FIG. 1 is a schematic diagram of a possible network architecture according to this application. The network architecture includes the following components.

An Access and Mobility Management Function (AMF) node is a network element responsible for mobility management, and may be configured to implement a function other than session management in mobility management entity (MME) functions, for example, a function such as lawful interception or access authorization.

A Session Management Function (SMF) node is configured to allocate a session resource to a user plane.

An Authentication Server Function (AUSF) node is responsible for verifying and transferring a to-be-authenticated parameter and authenticating authenticity of a terminal when the AUSF node performs authentication on the terminal. Main functions include receiving an authentication request sent by a Security Anchor Function (SEAF) node, and selecting an authentication method.

The SEAF node is currently a part of the AMF node, and is mainly responsible for initiating an authentication request to the AUSF node, and completing network side authentication on the terminal in an EPS-AKA* authentication process.

A User Plane Function (UPF) node is an egress of user plane data, and is configured to connect to an external network.

A data network (DN) is a network that provides external data, for example, the Internet.

A (Radio) access network ((R)AN) node may use different access technologies. Currently, there are two radio access technologies: a 3rd Generation Partnership Project (3GPP) access technology (for example, a radio access technology used in a 3G system, a 4G system, or a 5G system) and a non-3rd Generation Partnership Project (non-3GPP) access technology. The 3GPP access technology is an access technology that complies with a 3GPP standard specification, and an access network that uses the 3GPP access technology is referred to as a radio access network (RAN). An access network device in the 5G system is referred to as a next generation base station node (gNB). The non-3GPP access technology is an access technology that does not comply with the 3GPP standard specification, for example, a radio technology represented by a Wi-Fi access point (AP).

The terminal in this application is a device having a wireless receiving and sending function, and may be deployed on land, for example, an indoor or outdoor device, a handheld or in-vehicle device; or may be deployed on a water surface (for example, on a ship); or may be deployed in the air (for example, on an airplane, a balloon, or a satellite). The terminal may include various types such as user equipment (UE), a mobile phone, a tablet computer (pad), a computer having a wireless receiving and sending function, a wireless data card, a virtual reality VR) terminal device, an augmented reality (AR) terminal device, a machine type communication (MTC) terminal device, an industrial control terminal device, a self-driving terminal device, a remote medical terminal device, a smart grid terminal device, a transportation safety (transportation safety) terminal device, a smart city terminal device, and a wearable device (for example, a smart watch, a smart band, and a pedometer). Terminals having similar wireless communication functions may have different names in systems in which different radio access technologies are used. For ease of description, in the embodiments of this application, the foregoing apparatuses having a wireless receiving and sending communication function are collectively referred to as terminals.

Specifically, the terminal in this application stores a long-term key and a related function. When the terminal and a core network node (for example, the AMF node or the AUSF node) perform two-way authentication, the terminal may verify network authenticity by using the long-term key and the related function.

An access network device in the embodiments of this application is an apparatus that is deployed in a radio access network and that is configured to provide a wireless communication function for the terminal. For example, the access network device may be a base station (BS), and the base station may include a macro base station, a micro base station, a relay node, an access point, or the like in various forms. A device having a base station function may have different names in the systems in which different radio access technologies are used. For example, the device is referred to as a next generation base station node in the 5G system, is referred to as an evolved NodeB (evolved NodeB, eNB or eNodeB) in a Long Term Evolution (LTE) system, and is referred to as a NodeB in a 3rd generation (3G) communications system. For ease of description, in the embodiments of the present disclosure, the foregoing apparatuses that provide the wireless communication function for the terminal are collectively referred to as access network devices.

A Network Exposure Function (NEF) node is mainly configured to interact with a third party, so that the third party may indirectly interact with some network elements in a 3GPP network.

A Network Function Repository Function (NRF) node is configured to discover and maintain a network function (NF) between network elements.

A Policy Control Function (PCF) node stores a latest quality of service (QoS) rule. The base station may allocate a proper resource to a user plane transmission channel according to a QoS rule provided by the SMF node.

A unified data management (UDM) node is configured to store user subscription information.

An Application Function (AF) node may be located inside the DN, and is a functional network element deployed in a third party. The network element is mainly used to inform the PCF node of a latest service requirement of a third-party enterprise on an application. The PCF node may generate a corresponding QoS rule based on the service requirement, to ensure that a service provided by the data network meets the requirement proposed by the third party.

In an existing procedure, in a process in which the terminal is handed over from a source base station to a target base station, the target base station determines a signaling plane encryption algorithm, a signaling plane integrity protection algorithm, and a user plane encryption algorithm. In other words, the target base station simultaneously activates user plane security protection and signaling plane security protection. To be specific, in a procedure in which the terminal is handed over between serving base stations, regardless of whether the signaling plane security protection needs to be performed, the target base station activates the signaling plane security protection, and determines the signaling plane encryption algorithm and the signaling plane integrity protection algorithm, increasing network overheads, and increasing a time for the target base station to prepare for handover of the terminal. Consequently, handover efficiency of the terminal is relatively low.

To resolve the foregoing problem, in the embodiments of this application, a user plane security protection activating process may be decoupled from a signaling plane security protection activating process. To be specific, a user plane security protection may be first activated, and then the signaling plane security protection is activated when signaling plane protection needs to be performed. Therefore, network overheads for activating the signaling plane security protection are reduced in a handover process of the terminal, and the handover efficiency of the terminal can be improved.

First, related terms in the embodiments of this application are explained.

A first access network device may be a RAN node, for example, may be a next generation base station node in the 5G system. When the embodiments of this application are applied to the procedure in which the terminal is handed over between serving base stations, the first access network device may be a target next generation base station node (target next generation node basestation, TgNB).

A second access network device may be a RAN node, for example, may be a next generation base station node in the 5G system. When the embodiments of this application are applied to the procedure in which the terminal is handed over between serving base stations, the second access network device may be a source next generation base station node (source next generation node basestation, SgNB).

The following describes in detail the technical solutions provided in this application.

Figure 2:
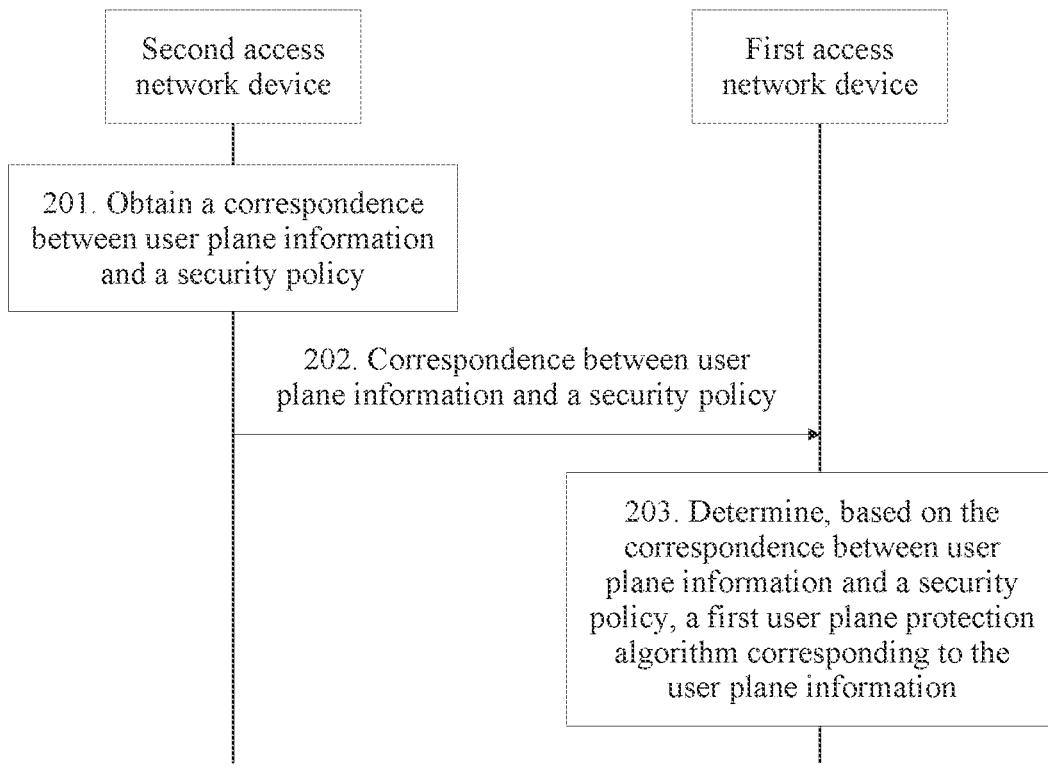
FIG. 2 is a flowchart of a security protection method according to an embodiment of this application.

As shown in FIG. 2, an embodiment of this application provides a security protection method, and the method includes steps 201 to 203.

Step 201: A second access network device obtains a correspondence between user plane information and a security policy.

The user plane information may include any one or more of a packet data unit (PDU) session identifier, a quality of service (QoS) parameter (for example, a quality of service flow identifier (QFI)), a data radio bearer (DRB) identifier, and a slice parameter (for example, a slice identifier).

The security policy is used to indicate a user plane security protection type for activation or is used to indicate a user plane protection algorithm identifier that is recommended to be activated. The security protection type includes one or both of user plane encryption protection and user plane integrity protection. The user plane protection algorithm identifier may be one or both of a user plane encryption algorithm identifier and a user plane integrity protection algorithm identifier. Specifically, the security policy may carry one or more user plane protection algorithm identifiers, for example, may carry at least one user plane encryption algorithm identifier, or at least one user plane integrity protection algorithm identifier, or at least one user plane encryption algorithm identifier and at least one user plane integrity protection algorithm identifier.

Specifically, a representation form of the correspondence between user plane information and a security policy may be a combination of user plane information and a security policy that are in a correspondence. Such a combination may be referred to as a correspondence between user plane information and a security policy in one combination. Optionally, the user plane information may be corresponding to a plurality of security policies by using one correspondence. For example, the user plane information in the correspondence between user plane information and a security policy in one combination includes a PDU session identifier, and the security policy includes a security policy 1 and a security policy 2. It may be understood that one PDU session identifier is corresponding to two security policies. For another example, the user plane information in the correspondence between user plane information and a security policy in one combination includes a DRB identifier, and the security policy includes a security policy 1 and a security policy 2. Alternatively, one piece of user plane information is corresponding to one security policy by using one correspondence. For example, the correspondence between user plane information and a security policy in one combination is a combination of one PDU session identifier and one security policy. For another example, the correspondence between user plane information and a security policy in one combination is a combination of one DRB identifier and one security policy.

Correspondences between user plane information and security policies in a plurality of combinations are a plurality of correspondences. For example, one of the correspondences is a combination of a PDU session identifier, a QoS parameter, a security policy 1, and a security policy 2, and another correspondence is a combination of a QoS parameter and a security policy 3.

Specifically, the second access network device determines, based on network side configuration information, to obtain the correspondence between user plane information and a security policy in one combination or the correspondences between user plane information and security policies in a plurality of combinations. For example, the correspondence between user plane information and a security policy is a combination of a PDU session identifier and a security policy. If the network side configuration information is that only a PDU session identifier of a session that needs to be handed over is transmitted, the second access network device obtains only one combination of a PDU session identifier and a security policy when only one session needs to be handed over; or when a plurality of sessions need to be handed over, the second access network device needs to obtain each combination of a PDU session identifier and a security policy for each PDU session that needs to be handed over, or the second access network device obtains, based on the network side configuration information, all combinations that are of PDU session identifiers and security policies and that are stored by the second access network device.

Optionally, the second access network device may obtain only one security policy, and the security policy is applicable to all user plane information.

Optionally, two pieces of bit information may be used to represent the security protection type for activation indicated by the security policy. For example, the security policy is "XY". X=0 indicates not activating the user plane encryption protection, X=1 indicates activating the user plane encryption protection, Y=0 indicates not activating the user plane integrity protection, and Y=1 indicates activating the user plane integrity protection.

For example, {PDU session ID=1, 11} indicates that the PDU session identifier is 1, and a security policy corresponding to the PDU session identifier is activating the user plane encryption protection, and activating the user plane integrity protection. Alternatively, {QFI=1, 11} indicates that for a QoS flow whose QoS flow identifier is 1, a security policy corresponding to the QoS flow is activating the user plane encryption protection, and activating the user plane integrity protection. Alternatively. {DRB ID=1, 11} indicates that the DRB identifier is 1, and a security policy corresponding to a DRB whose DRB identifier is 1 is activating the user plane encryption protection, and activating the user plane integrity protection.

For another example, {PDU session ID=1, 10, DRB ID=1} indicates that a DRB whose DRB identifier is 1 is being used for a session whose PDU session identifier is 1, and a corresponding security policy is activating the user plane encryption protection but not activating the user plane integrity protection. Alternatively, {QFI=1, 10, DRB ID=1} indicates that a DRB whose DRB identifier is 1 is being used for a QoS flow whose QoS flow identifier is 1, and a corresponding security policy is activating the user plane encryption protection but not activating the user plane integrity protection.

For another example, {PDU session ID=2, QFI=1, 01, DRB ID=2} indicates that a DRB whose DRB identifier is 2 is being used for a QoS flow whose QFI is 1 in a session whose PDU session identifier is 2, and a corresponding security policy is not activating the user plane encryption protection but activating the user plane integrity protection.

For another example, {DRB ID=1, DRB ID=2, 01} indicates that a security policy corresponding to a DRB whose DRB identifier is 1 and a security policy corresponding to a DRB whose DRB identifier is 2 are not activating the user plane encryption protection but activating the user plane integrity protection.

Optionally, the second access network device may determine correspondences between user plane information and security policies in a plurality of combinations. The second access network device needs to obtain each correspondence between a PDU session identifier of a PDU session that needs to be handed over and a security policy in a procedure in which a terminal is handed over between serving base stations. For example, the correspondences between user plane information and security policies in a plurality of combinations may be {{PDU session ID=1, 10, DRB ID=1}, {PDU session ID=2. QFI=1, 01, DRB ID=2}}.

Optionally, an activated user plane protection algorithm identifier indicated by the security policy may be represented by using a recommended algorithm identifier. For example, the correspondence between user plane information and a security policy may be {PDU session ID=1, NIA=1, NEA=2}, and this indicates that, for a session whose PDU session identifier is 1, a user plane integrity protection algorithm 1 is used to perform user plane integrity protection, and a user plane encryption algorithm 2 is used to perform user plane encryption protection. Optionally, the user plane integrity protection is not activated if a NIA=0, and the user plane encryption protection is not activated if a NEA=0. In another example, {PDU session ID=1, NIA=1. NIA=2, NEA=2, NEA=1} indicates that, for a session whose PDU session identifier is 1, a user plane integrity protection algorithm 1 is preferentially recommended to be used to perform user plane integrity protection, a user plane integrity protection algorithm 2 is secondly recommended to be used to perform user plane integrity protection, a user plane encryption algorithm 2 is preferentially recommended to be used to perform user plane encryption protection, and a user plane encryption algorithm 1 is secondly recommended to be used to perform user plane encryption protection. For another example, the correspondence between user plane information and a security policy may be {DRB ID=1, NIA=1, NEA=2}, and this indicates that, for a session whose DRB identifier is 1, a user plane integrity protection algorithm 1 is used to perform user plane integrity protection, and a user plane encryption algorithm 2 is used to perform user plane encryption protection.

Optionally, the correspondence between user plane information and a security policy may be {PDU session ID=1, "1111", NEA=2}, and this indicates that, for a session whose PDU session identifier is 1, the user plane integrity protection is not activated, and a user plane encryption algorithm 2 is used to perform encryption protection on user plane data.

For another example, the correspondence between user plane information and a security policy may be {PDU session ID=1, NIA=1, "11" }, and this indicates that, for a session whose PDU session identifier is 1, a user plane integrity protection algorithm 1 is used to perform user plane integrity protection, and user plane encryption protection is not activated.

"1111" is indication information, and is used to indicate that specific protection is not activated. In the correspondence between user plane information and a security policy, if "1111" is at a location that needs to carry a user plane encryption algorithm identifier, the user plane encryption protection is not activated; or if "111" is at a location that needs to carry a user plane integrity protection algorithm identifier, the user plane integrity protection is not activated. It should be noted that "1111" is used as an example in the present disclosure, and other indication information of a similar function falls within the protection scope of the present disclosure.

Step 202: The second access network device sends the correspondence between user plane information and a security policy to a first access network device. Correspondingly, the first access network device receives the correspondence between user plane information and a security policy from the second access network device.

The second access network device may send the correspondence that is between user plane information and a security policy and that is obtained in step 201 to the first access network device.

Optionally, the second access network device may send the correspondence between user plane information and a security policy in one combination and the correspondences between user plane information and security policies in a plurality of combinations to the first access network device.

Specifically, a quantity of correspondences that are between user plane information and security policies and that are sent by the second access network device is the same as a quantity of correspondences that are between user plane information and security policies and that are obtained by the second access network device in step 201.

In a possible manner, the second access network device may send only the security policy to the first access network device, and the security policy is applicable to all user plane information related to the terminal.

Step 203: The first access network device determines, based on the correspondence between user plane information and a security policy, a first user plane protection algorithm corresponding to the user plane information.

The first user plane protection algorithm includes one or both of a user plane encryption algorithm and a user plane integrity protection algorithm.

Optionally, if the security policy in the correspondence that is between user plane information and a security policy and that is received by the first access network device is used to indicate the activated security protection type, the first access network device determines a first user plane protection algorithm corresponding to each security protection type for activation indicated by the security policy.

Specifically, each security protection type is corresponding to one algorithm set. In an implementation, the first access network device stores a user plane encryption algorithm set and a user plane integrity protection algorithm set. The first access network device neither distinguishes between the user plane encryption algorithm and a signaling plane encryption algorithm nor distinguishes between the user plane integrity protection algorithm and a signaling plane integrity protection algorithm. In other words, the user plane encryption algorithm set may also be used as a signaling plane encryption algorithm set, and the user plane integrity protection algorithm set may also be used as a signaling plane integrity protection algorithm set. In another implementation, the first access network device distinguishes between the user plane encryption algorithm and a signaling plane encryption algorithm, and distinguishes between the user plane integrity protection algorithm and a signaling plane integrity protection algorithm. The first access network device stores a user plane encryption algorithm set, a user plane integrity protection algorithm set, a signaling plane encryption algorithm set, and a signaling plane integrity protection algorithm set.

It should be noted that each algorithm set described above may exist in a form of a priority list. The user plane encryption algorithm set is used as an example. The user plane encryption algorithm set may be a priority list, and user plane encryption algorithms in the priority list are arranged in descending order of priorities.

If the security protection type for activation indicated by the security policy is the user plane encryption protection, the first access network device selects one encryption algorithm from the user plane encryption algorithm set, and optionally, may select, from the user plane encryption algorithm set, a user plane encryption algorithm that is supported by the terminal and that has a highest priority. For example, the terminal supports a user plane encryption algorithm 1 and a user plane encryption algorithm 3, and a priority of the user plane encryption algorithm 1 is higher than a priority of the user plane encryption algorithm 3 in the user plane encryption algorithm set. Therefore, the first access network device selects the user plane encryption algorithm 1.

If the security protection type for activation indicated by the security policy is the user plane integrity protection, the first access network device selects one user plane integrity protection algorithm from the user plane integrity protection algorithm set, and optionally, may select, from the user plane integrity protection algorithm set, a user plane integrity protection algorithm that is supported by the terminal and that has a highest priority. For example, the terminal supports a user plane integrity protection algorithm 1 and a user plane integrity protection algorithm 3, and a priority of the user plane integrity protection algorithm 1 is higher than a priority of the user plane integrity protection algorithm 3 in the user plane integrity protection algorithm set. Therefore, the first access network device selects the user plane integrity protection algorithm 1.

If activated security protection types indicated by the security policy are the user plane encryption protection and the user plane integrity protection, the first access network device selects one user plane encryption algorithm from the user plane encryption algorithm set, and selects one user plane integrity protection algorithm from the user plane integrity protection algorithm set.

For example, if the correspondence that is between user plane information and a security policy and that is received by the first access network device is {PDU session ID=1, 11}, the first access network device determines that the user plane encryption protection and the user plane integrity protection need to be activated for a session whose PDU session identifier is 1, and the first access network device further selects, from the user plane encryption algorithm set, a user plane encryption algorithm that is supported by the terminal and that has a highest priority, and selects, from the user plane integrity protection algorithm set, a user plane integrity protection algorithm that is supported by the terminal and that has a highest priority.

Optionally, if the security policy in the correspondence that is between user plane information and a security policy and that is received by the first access network device includes the recommended user plane protection algorithm identifier, step 203 may be specifically implemented as follows:

The first access network device determines a second user plane protection algorithm corresponding to the user plane protection algorithm identifier; and if both the first access network device and a terminal support the second user plane protection algorithm, the first access network device determines that the second user plane protection algorithm is the first user plane protection algorithm; or if either of the first access network device or a terminal does not support the second user plane protection algorithm, the first access network device selects, from a security algorithm set corresponding to a security protection type to which the second user plane protection algorithm belongs, the first user plane protection algorithm that is supported by the terminal and that has a highest priority.

If there is more than one recommended user plane protection algorithm identifier, the foregoing steps are repeated, to separately determine a first user plane protection algorithm based on each recommended user plane protection algorithm identifier.

It may be understood that the security policy includes the user plane protection algorithm identifier, and therefore implicitly indicates the activated security protection type.

For example, the correspondence that is between user plane information and a security policy and that is received by the first access network device is {PDU session ID=1, NIA=1, NEA=2}. Therefore, the first access network device determines that the user plane integrity protection and the user plane encryption protection need to be activated for a session whose PDU session identifier is 1.

Then, the first access network device determines whether the user plane integrity protection algorithm 1 meets the following conditions:

Condition 1: The user plane integrity protection algorithm 1 is a user plane integrity protection algorithm supported by both the first access network device and the terminal.

Condition 2: The user plane integrity protection algorithm 1 is a user plane integrity protection algorithm supported by both the first access network device and the terminal, and the user plane integrity protection algorithm 1 is the user plane integrity protection algorithm that is supported by the terminal and that has the highest priority in the user plane integrity protection algorithm set of the first access network device. For example, if the terminal supports the user plane integrity protection algorithm 1 and a user plane integrity protection algorithm 3, both of the algorithms are in the user plane integrity protection algorithm set, and a priority of the user plane integrity protection algorithm 1 is higher than a priority of the user plane integrity protection algorithm 3 in the user plane integrity protection algorithm set, it is considered that the user plane integrity protection algorithm 1 meets Condition 2.

The user plane integrity protection algorithm 1 is used if the user plane integrity protection algorithm 1 meets Condition 1 or Condition 2. If the user plane integrity protection algorithm 1 does not meet Condition 1 or does not meet Condition 2, the first access network device selects, from the user plane integrity protection algorithm set, the user plane integrity protection algorithm that is supported by the terminal and that has the highest priority.

The first access network device may further determine whether the user plane encryption algorithm 2 meets the following conditions:

Condition 3: The user plane encryption algorithm 2 is a user plane encryption algorithm supported by both the first access network device and the terminal.

Condition 4: The user plane encryption algorithm 2 is a user plane encryption algorithm supported by both the first access network device and the terminal, and the user plane encryption algorithm 2 is the user plane encryption algorithm that is supported by the terminal and that has the highest priority in the user plane encryption algorithm set of the first access network device. For example, if the terminal supports the user plane encryption algorithm 2 and a user plane encryption algorithm 3, both of the algorithms are in the user plane encryption algorithm set, and a priority of the user plane encryption algorithm 2 is higher than a priority of the user plane encryption algorithm 3 in the user plane encryption algorithm set, it is considered that the user plane encryption algorithm 2 meets Condition 2.

The user plane encryption algorithm 2 is used if the user plane encryption algorithm 2 meets Condition 3 or Condition 4. If the user plane encryption algorithm 2 does not meet Condition 3 or does not meet Condition 4, the first access network device selects, from the user plane encryption algorithm set, the user plane encryption algorithm that is supported by the terminal and that has the highest priority.

For another example, if the correspondence that is between user plane information and a security policy and that is received by the first access network device is {PDU session ID=1, "1111", NEA=2}, the first access network device determines that the user plane encryption protection needs to be activated for a session whose PDU session identifier is 1, and the user plane integrity protection does not need to be activated. Therefore, the first access network device needs to determine only the user plane encryption algorithm in the foregoing method, and does not need to determine the user plane integrity protection algorithm.

Optionally, in a possible implementation of this embodiment of this application, the first access network device may ignore specific content of the received security policy, and the first access network device may determine the security protection type for activation according to a preconfigured security policy.

For example, if the security policy received by the first access network device indicates activating neither the user plane encryption protection nor the user plane integrity protection, and the preconfigured security policy indicates activating the user plane encryption protection but not activating the user plane integrity protection, the first access network device activates the user plane encryption protection according to the preconfigured security policy, and selects, from the user plane encryption algorithm set, a user plane encryption algorithm that is supported by both the first access network device and the terminal and that has a highest priority.

It should be noted that if the first access network device receives the correspondences between user plane information and security policies in a plurality of combinations, the first access network device needs to separately determine a first user plane protection algorithm corresponding to user plane information in each combination.

According to the security protection method provided in this embodiment of this application, the first access network device may determine only a user plane protection algorithm, and does not need to activate signaling plane protection, thereby reducing network overheads, and improving handover efficiency of the terminal.

In a possible implementation of this embodiment of this application, that the first access network device determines, based on the correspondence between user plane information and a security policy, a first user plane protection algorithm corresponding to the user plane information in step 203 means that the first access network device determines only the user plane protection algorithm and does not determine a signaling plane protection algorithm in step 203.

In another possible implementation of this embodiment of this application, in step 203, the first access network device may determine, based on the correspondence between user plane information and a security policy, the first user plane protection algorithm corresponding to the user plane information, and determines the first user plane protection algorithm as a signaling plane protection algorithm. In other words, in step 203, the first access network device determines a pair of security protection algorithms, and the pair of security protection algorithms are used as both user plane protection algorithms and signaling plane protection algorithms. Optionally, if the first user plane protection algorithm is one of the user plane encryption algorithm and the user plane integrity protection algorithm, the determined first user plane protection algorithm is used as a signaling plane protection algorithm, and another signaling plane protection algorithm is further determined. For example, if the first user plane protection algorithm is a user plane encryption algorithm, the user plane encryption algorithm is used as a signaling plane encryption algorithm, and the signaling plane integrity protection algorithm needs to be further determined. A determining method is that the first access network device determines the signaling plane integrity protection algorithm based on a terminal security capability (namely, a signaling plane integrity protection algorithm supported by the terminal) and a signaling plane integrity protection algorithm set preconfigured by the second access network device (a list of signaling plane integrity protection algorithms arranged based on priorities).

In a possible implementation, the first access network device may determine the signaling plane protection algorithm before determining the first user plane protection algorithm. In other words, the first access network device may first determine the signaling plane protection algorithm, and then determine whether the signaling plane protection algorithm can be used as the first user plane protection algorithm.

Figure 3A:
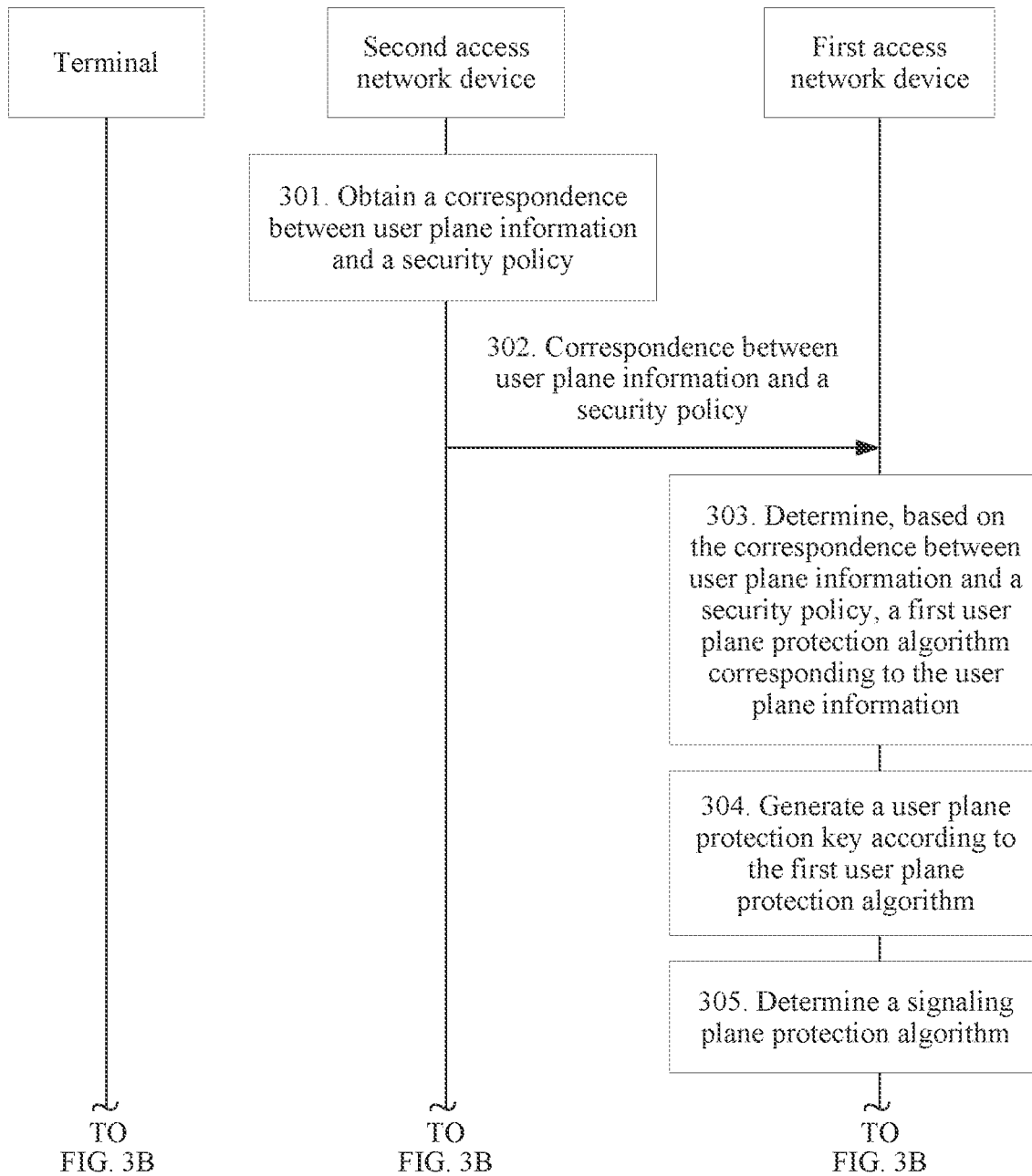
FIG. 3A and FIG. 3B are a flowchart of another security protection method according to an embodiment of this application.
Figure 3B:
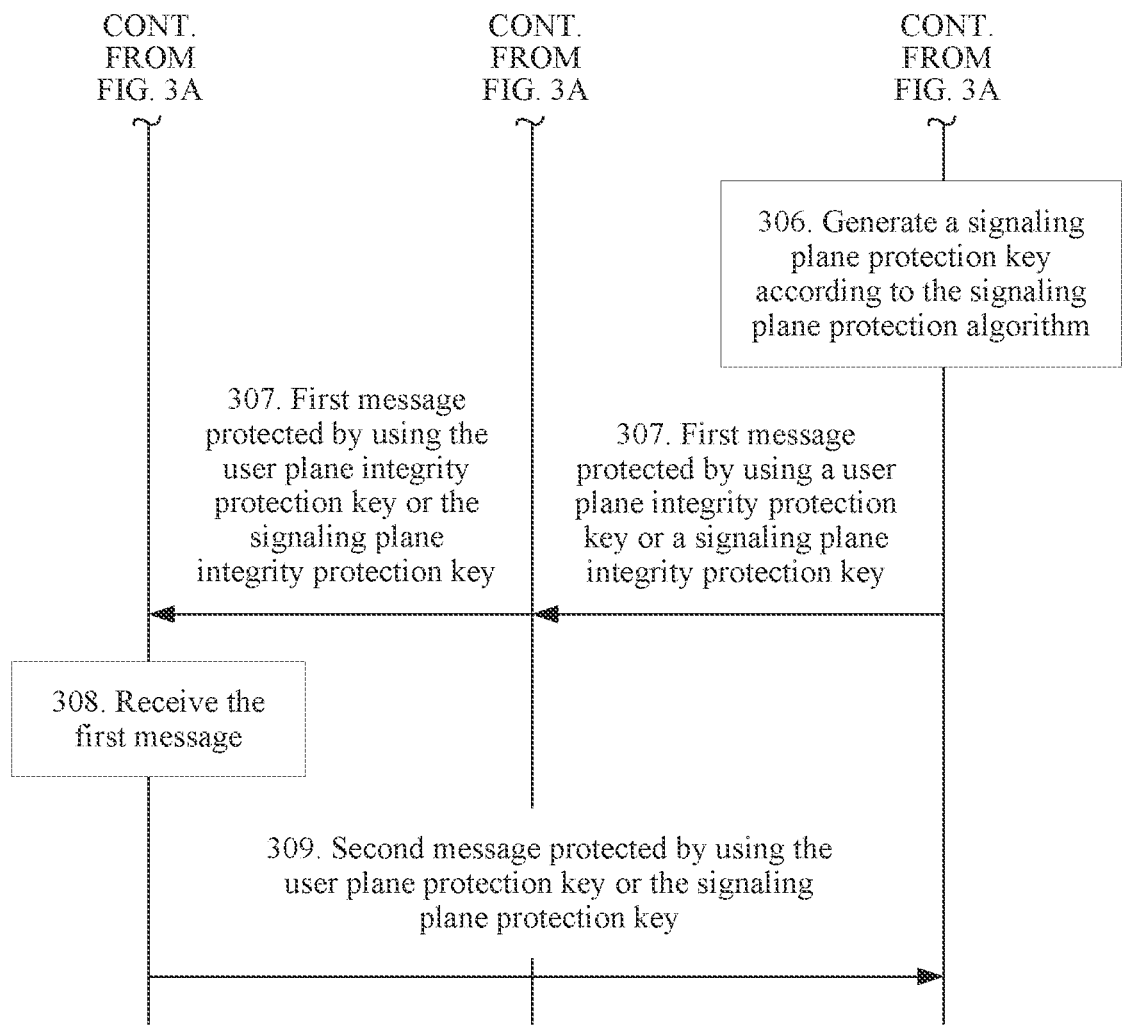

In another possible implementation of the embodiments of this application, a first access network device may determine a signaling plane protection algorithm before sending a signaling plane message. As shown in FIG. 3A and FIG. 3B, that a signaling plane protection algorithm is determined after a first user plane protection algorithm is determined is used as an example for description in FIG. 3A and FIG. 3B. The method includes step 301 to 309.

For steps 301 to 303, refer to related descriptions in steps 201 to 203. Certainly, this application is not limited thereto.

Optionally, after determining the first user plane protection algorithm, the first access network device further needs to generate a user plane protection key, to perform security protection on user plane data, namely, needs to perform step 304.

Step 304: The first access network device generates a user plane protection key according to the first user plane protection algorithm.

The user plane protection key includes one or both of a user plane encryption key and a user plane integrity protection key.

The user plane protection key includes only the user plane encryption key if the first access network device determines only a user plane encryption algorithm in step 303; or the user plane protection key includes only the user plane integrity protection key if the first access network device determines only a user plane integrity protection algorithm; or the user plane protection key includes both the user plane encryption key and the user plane integrity protection key if the first access network device determines both a user plane encryption algorithm and a user plane integrity protection algorithm.

It should be noted that step 304 is not necessarily performed before step 305 in this embodiment of this application. After the first access network device determines the first user plane protection algorithm in step 303, step 304 may be performed when the user plane data needs to be sent, to generate the user plane protection key, and perform security protection on the user plane data.

Step 305: The first access network device determines a signaling plane protection algorithm.

The signaling plane protection algorithm includes one or both of a signaling plane encryption algorithm and a signaling plane integrity protection algorithm.

Optionally, there are several trigger occasions of step 305:

Occasion 1: Step 305 is triggered when the first access network device needs to send a signaling plane message. For example, step 305 is triggered when the first access network device needs to send a configuration message to a terminal device.

Occasion 2: If the method shown in FIG. 2 is applied to a process in which a terminal is handed over between serving base stations, step 305 may be triggered after the first access network device sends the user plane data.

Occasion 3: Step 305 is triggered before the first access network device returns to a suspend state.

The suspend state means that in this state, a terminal and a base station retain some AS contexts, for example, a generated key and a determined algorithm.

Occasion 4: Step 305 is triggered after the first access network device receives uplink signaling plane data sent by a terminal, for example, step 305 is triggered after the terminal initiates a PDU session request.

Step 306: The first access network device generates a signaling plane protection key according to the signaling plane protection algorithm.

The signaling plane protection key includes one or both of a signaling plane encryption key and a signaling plane integrity protection key.

Optionally, the signaling plane protection key includes only the signaling plane encryption key if the first access network device determines only the signaling plane encryption algorithm in step 305; optionally, the signaling plane protection key includes only the signaling plane integrity protection key if the first access network device determines only the signaling plane integrity protection algorithm; optionally, the signaling plane protection key includes both the signaling plane encryption key and the signaling plane integrity protection key if the first access network device determines both the signaling plane encryption algorithm and the signaling plane integrity protection algorithm.

Step 307: The first access network device sends, to a terminal via the second access network device, a first message protected by using a user plane integrity protection key or a signaling plane integrity protection key.

The first message includes the first user plane protection algorithm. Optionally, the first message further includes the signaling plane protection algorithm.

It should be noted that step 307 may be performed before step 305 if the first message is protected by using the user plane integrity protection key. An execution sequence of step 305, step 306, and step 307 is not limited in this application.

Optionally, the first access network device may perform integrity protection on the first message by using the user plane integrity protection key; or the first access network device may perform integrity protection on the first message by using the signaling plane integrity protection key; or if the first access network device generates both the user plane integrity protection key and the signaling plane integrity protection key, the first access network device may preferentially perform integrity protection on the first message by using the signaling plane integrity protection key.

Optionally, user plane integrity protection is not performed on the first message if the first access network device does not generate the signaling plane integrity protection key and a security policy received by the first access network device indicates not activating the user plane integrity protection. Optionally, the first access network device may generate a random number, encrypt the random number by using the user plane encryption key, add an encrypted random number to the first message, send the first message to the terminal, and send an unencrypted random number to the terminal. Optionally, the signaling plane integrity protection key is used to perform integrity protection on the first message if the signaling plane integrity protection key is generated and a security policy received by the first access network device indicates not activating user plane integrity protection.

Alternatively, if the first access network device generates both the user plane integrity protection key and the user plane encryption key, the first access network device may perform integrity protection on the first message by using the user plane integrity protection key. Optionally, the first access network device may further generate a random number, add a random number encrypted by using the user plane encryption key to the first message, send the first message to the terminal, and send an unencrypted random number to the terminal.

Optionally, the first message may carry first indication information. The first indication information is used to indicate that the first user plane protection algorithm is the same as the signaling plane protection algorithm, and is specifically used to indicate that the signaling plane protection algorithm is reused as the first user plane protection algorithm. Further, after receiving the correspondence between user plane information and a security policy, the first access network device first determines the signaling plane encryption algorithm and the signaling plane integrity protection algorithm, and then determines, according to the security policy, a signaling plane protection algorithm that is reused as the user plane protection algorithm. Alternatively, the first indication information is used to indicate a signaling plane protection algorithm identifier determined by the first access network device.

Optionally, the first indication information may not be carried in the first message. The first access network device may send a dedicated message to the terminal via the second access network device, and the dedicated message carries the first indication information.

It may be understood that the first access network device needs to send the first indication information to the terminal regardless of a used signaling plane protection key determining method described in the foregoing embodiment, to inform the terminal of the signaling plane protection algorithm used by the first access network device, so that the terminal can decrypt a message protected by a signaling plane.

Step 308: The terminal receives the first message.

The terminal may read the first user plane protection algorithm in the first message after receiving the first message. If the first user plane protection algorithm includes a user plane integrity protection algorithm, the terminal generates the user plane integrity protection key according to the user plane integrity protection algorithm, and performs user plane integrity verification on the first message by using the user plane integrity protection key. If the verification fails, a handover procedure is not further performed, or step 309 is performed.

If the first user plane protection algorithm does not include a user plane integrity protection algorithm, but includes a user plane encryption algorithm, the terminal may generate the user plane encryption key according to the user plane encryption algorithm. Optionally, the random number in the first message is decrypted by using the user plane encryption key, and a decrypted random number is compared with the received unencrypted random number. If a comparison result is that the two random numbers are different, a handover procedure is not further performed, or step 309 is performed.

If the first message carries the signaling plane protection algorithm, and the signaling plane integrity protection key is used to perform integrity protection, the terminal generates the signaling plane integrity protection key according to the signaling plane integrity protection algorithm, and performs signaling plane integrity verification on the first message by using the signaling plane integrity protection key. If the verification fails, a message is optionally returned to the second access network device, to indicate that the signaling plane integrity verification fails, or that a handover procedure is not further performed.

Step 309: The terminal sends, to the first access network device, a second message protected by using the user plane protection key or the signaling plane protection key. Correspondingly, the first access network device receives the second message.

The second message is a response message of the first message.

The second message is an acknowledgement message of the first message if the verification of the terminal on the first message succeeds in step 308. Optionally, the terminal protects the second message by using a method the same as the method for protecting the first message. To be specific, the terminal may perform integrity protection on the second message by using the user plane integrity protection key, or perform signaling plane integrity protection on the second message by using the signaling plane integrity protection key, or generate a random number again, encrypt two random numbers by using the user plane encryption key, and add two encrypted random numbers and two unencrypted random numbers to the second message. The second message is a message for error prompt if the verification of the terminal on the first message fails. According to the method provided in this embodiment of this application, the first access network device may activate only user plane protection in the handover procedure of the terminal, and determines the signaling plane protection algorithm only when the first access network device needs to send the signaling plane message, thereby not only improving handover efficiency of the terminal, but also ensuring security of the signaling plane message.

Figure 4:
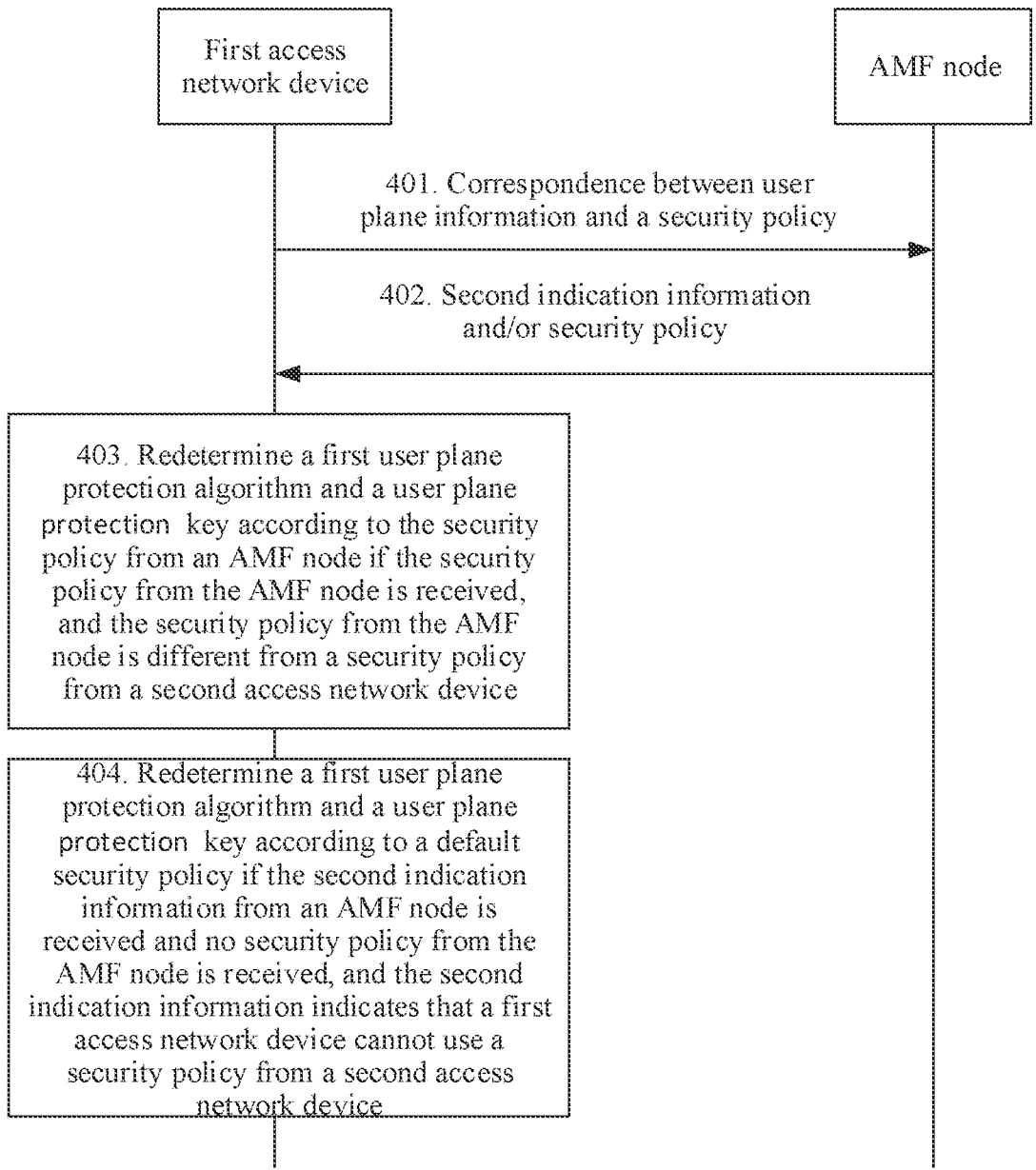
FIG. 4 is a flowchart of another security protection method according to an embodiment of this application.

Optionally, after the procedure shown in FIG. 3A and FIG. 3B, the first access network device further needs to verify the received security policy from the second access network device. As shown in FIG. 4, the method includes steps 401 to 404.

Step 401: A first access network device sends a correspondence between user plane information and a security policy to an AMF node. Correspondingly, the AMF node receives the correspondence between user plane information and a security policy.

Step 402: The AMF node sends one or both of second indication information and a security policy to the first access network device. Correspondingly, the first access network device receives one or both of the second indication information and the security policy.

The second indication information is used to indicate whether the first access network device can continue using a security policy from a second access network device.

Specifically, optionally, after receiving the correspondence between user plane information and a security policy from the first access network device, the AMF node first determines whether the AMF node stores each correspondence between user plane information and a security policy. If the AMF node stores the correspondence, the AMF node determines whether a received security policy corresponding to user plane information is the same as a security policy that is corresponding to the user plane information and that is stored by the AMF node. The first access network device can continue using the security policy received from the second access network device if the two security policies are the same. In this case, the AMF node may send the second indication information to the first access network device, and the second indication information is used to indicate that the first access network device can use the security policy received from the second access network device; or the AMF node sends the security policy to the first access network device, and the security policy is the same as a security policy sent by the first access network device to the AMF node.

Alternatively, the first access network device cannot continue using the security policy received from the second access network device if a security policy corresponding to user plane information received by the AMF node is different from a security policy that is corresponding to the user plane information and that is stored by the AMF node. In this case, the AMF node sends the second indication information to the first access network device, and the second indication information is used to indicate that the first access network device cannot use the security policy from the second access network device; or the AMF node sends the security policy to the first access network device, and the security policy is the security policy that is corresponding to the user plane information and that is stored by the AMF node.

Optionally, if the AMF node stores no correspondence between user plane information and a security policy, the AMF node may forward the received correspondence between user plane information and a security policy from the first access network device to an SMF node. The SMF node determines whether the first access network device can continue using a correspondence between user plane information and a security policy from the second access network device. A specific determining method is the same as a determining method performed by the AMF node. Then the AMF node sends one or both of the second indication information and the security policy to the first access network device based on a result of determining of the SMF node.

Step 403: Redetermine a first user plane protection algorithm and a user plane protection key according to the security policy from the AMF node if the first access network device receives the security policy from the AMF node, and the security policy from the AMF node is different from a security policy from a second access network device.

Optionally, if the security policy from the AMF node is the same as the security policy from the second access network device, the AMF node can continue using the security policy from the second access network device, and does not need to redetermine the first user plane protection algorithm and the user plane protection key.

Step 404: The first access network device redetermines a first user plane protection algorithm and a user plane protection key according to a default security policy if the first access network device receives the second indication information from the AMF node and receives no security policy from the AMF node, and the second indication information indicates that the first access network device cannot use a security policy from a second access network device.

Optionally, if the second indication information indicates that the first access network device may use the security policy from the second access network device, the first access network device can continue using the security policy from the second access network device, and does not need to redetermine the first user plane protection algorithm and the user plane protection key.

According to the security protection method provided in this embodiment of this application, after a random access process is completed, a TgNB may verify a currently used security policy, to obtain a security policy applicable to a resource status of the TgNB. If an SgNB is cracked by an attacker, and sends, to the TgNB, a security policy of reducing a security level, a security capability level of a user plane protection algorithm determined by the TgNB according to the security policy is relatively low, and information protected by using the user plane protection algorithm can be easily cracked. Therefore, the TgNB uses the security policy delivered by the AMF node, so that this vulnerability can be avoided, and security can be further improved.

Figure 5:
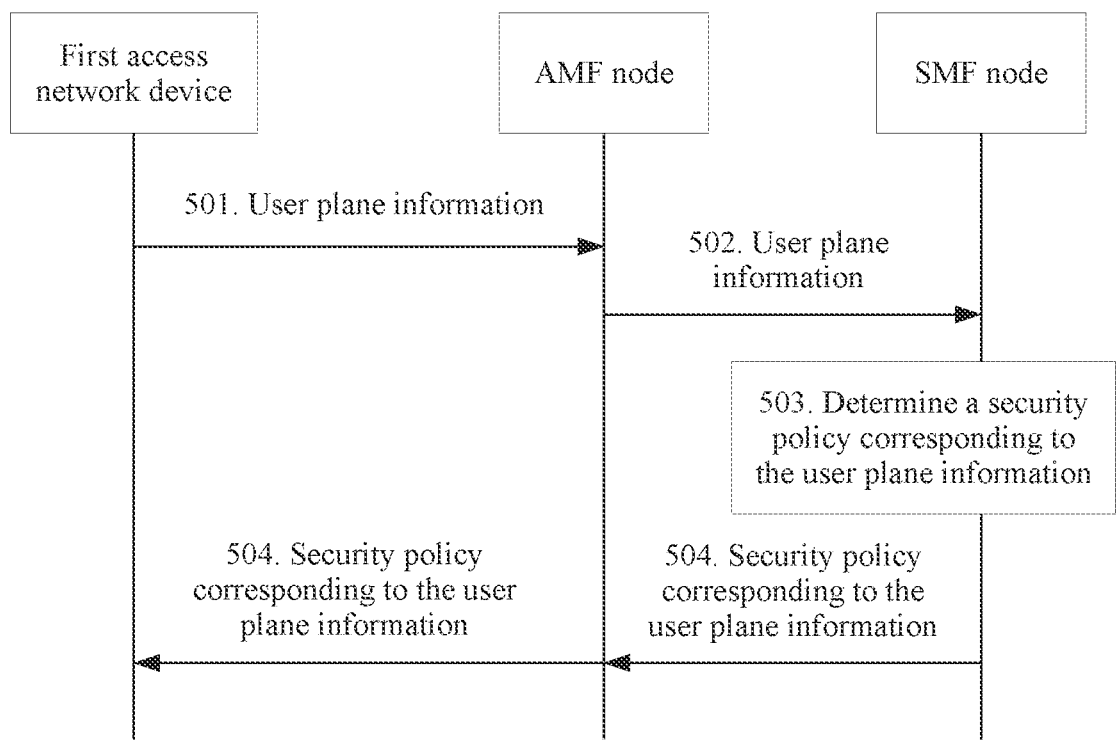
FIG. 5 is a flowchart of another security protection method according to an embodiment of this application.

Optionally, when a second access network device cannot directly communicate with a first access network device, the second access network device may determine the first access network device via an AMF node. For example, if there is no direct communications interface between an SgNB and a TgNB in a procedure in which a terminal is handed over between serving base stations, the SgNB may determine the TgNB via the AMF node. As shown in FIG. 5, the method includes steps 501 to 504.

Step 501: A second access network device sends user plane information to an AMF node. Correspondingly, the AMF node receives the user plane information.

Step 502: The AMF node sends the user plane information to an SMF node. Correspondingly, the SMF node receives the user plane information.

Step 503: The SMF node determines a security policy corresponding to the user plane information.

Optionally, the SMF node stores or may obtain each correspondence between user plane information and a security policy. After receiving the user plane information, the SMF node may search the correspondence between user plane information and a security policy for the security policy corresponding to the user plane information.

Step 504: The SMF node sends the security policy corresponding to the user plane information to a first access network device via the AMF node. Correspondingly, the first access network device receives the security policy corresponding to the user plane information.

It should be noted that, for a processing procedure after the first access network device receives the security policy corresponding to the user plane information, refer to processing procedures in the embodiments corresponding to FIG. 2, FIG. 3A, and FIG. 3B. Certainly, this application is not limited thereto.

Figure 6:
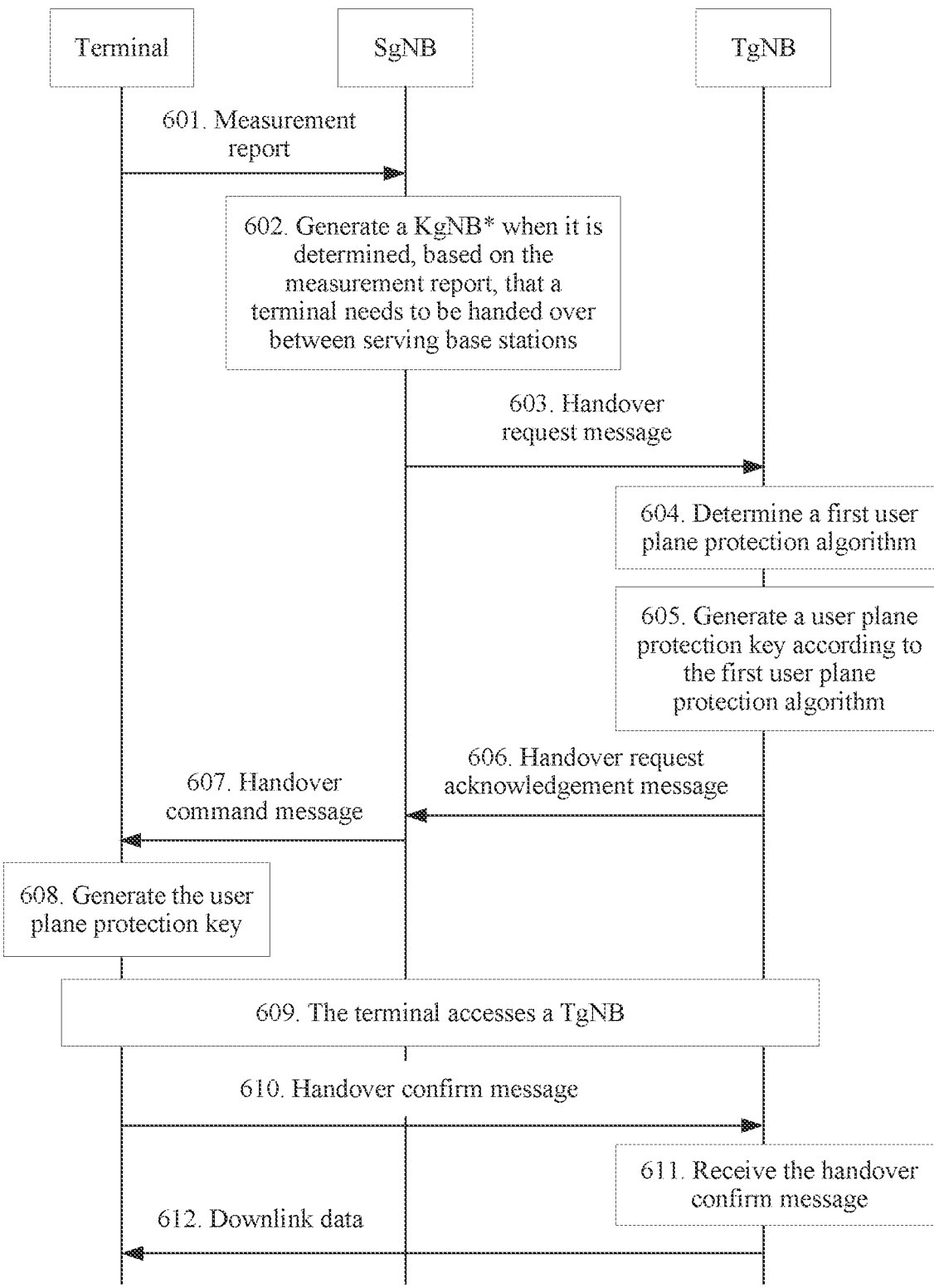
FIG. 6 is a flowchart of another security protection method according to an embodiment of this application.

It should be noted that all method procedures described in the foregoing embodiments corresponding to FIG. 2 to FIG. 5 may be applied to a process in which a terminal is handed over between serving base stations. A first access network device may be a TgNB, and a second access network device may be an SgNB. As shown in FIG. 6, a scenario in which a terminal is handed over between serving base stations is used to describe the security protection method in this application in FIG. 6. The method specifically includes steps 601 to 612.

Step 601: The terminal sends a measurement report to an SgNB. Correspondingly, the SgNB receives the measurement report.

Step 602: The SgNB generates a key in next generation base station (KgNB*) when determining, based on the measurement report, that the terminal needs to be handed over between serving base stations.

Step 603: The SgNB sends a handover request (HO request) message to a TgNB. Correspondingly, the TgNB receives the handover request message.

The handover request message includes a correspondence between user plane information and a security policy, and may further include a user plane security related parameter.

The user plane information includes any one or more of a PDU session identifier, a QFI, a DRB ID, and a slice parameter. Optionally, the user plane information includes any one or more of a PDU session identifier of a session that currently needs to be handed over, a QFI of the session that needs to be handed over, and a DRB ID corresponding to the PDU session that needs to be handed over. Alternatively, the user plane information includes PDU session identifiers of all sessions of the terminal, and indicates a PDU session identifier of a session that needs to be handed over.

For example, the user plane information is a PDU session identifier. Each PDU session identifier is corresponding to one security policy, and the security policy is used to indicate whether user plane encryption protection and user plane integrity protection need to be activated for a session corresponding to the security policy. Optionally, the security policy may further include one or both of a user plane encryption algorithm identifier and a user plane integrity protection algorithm identifier.

Optionally, the handover request message may carry security policies corresponding to all PDU session identifiers of the terminal, or may carry only a security policy corresponding to the PDU session identifier of a PDU session that needs to be handed over.

For example, the correspondence that is between user plane information and a security policy and that is carried in the handover request message is {{PDU session ID=1, 10, DRB ID=1}, {PDU session ID=2, QFI=1, 01, DRB ID=2}}. This indicates that there are two sessions that need to be handed over: a session 1 and a session 2. A DRB whose DRB ID is 1 is used for the session 1, and the user plane encryption protection is activated but the user plane integrity protection is not activated for the session 1. A DRB whose DRB ID is 2 is used for a QoS flow whose QFI is 1 in the session 2, and the user plane encryption protection is not activated but the user plane integrity protection is activated for the QoS flow.

For another example, the correspondence that is between user plane information and a security policy and that is carried in the handover request message is {PDU session ID=1, NIA=1, NEA=2}. This indicates that a session 1 needs to be handed over. A user plane integrity protection algorithm 1 is used to perform user plane integrity protection on the session 1, and a user plane encryption algorithm 2 is used to perform user plane encryption protection.

For another example, the terminal has three correspondences between user plane information and security policies in total. The handover request message carries the three correspondences between user plane information and security policies, and one bit is used to indicate a correspondence between user plane information that needs to be handed over and a security policy. Herein, activation bit=0 indicates that a session does not need to be handed over, and activation bit=1 indicates that a session needs to be handed over. For example, {{PDU session ID=1, 10, DRB ID=1, activation bit=0}, {PDU session ID=2, 11, DRB ID=1, activation bit=1}, {PDU session ID=3, 01, DRB ID=2, activation bit=1}} indicates that the terminal has a session 1, a session 2, and a session 3, and the session 2 and the session 3 are sessions that need to be handed over.

For handover efficiency of the terminal, the handover request message may carry only a security policy corresponding to the user plane information that needs to be handed over. That the handover request message carries only the security policy corresponding to the user plane information that needs to be handed over is used as an example for description below.

The user plane security related parameter includes a terminal security capability and the KgNB*. Optionally, the user plane security related parameter may further include information such as a freshness parameter (for example, a sequence number or a counter value) that is used to generate a key, and a key identifier that is used to identify a currently used key.

The terminal security capability includes a user plane protection algorithm identifier supported by the terminal. For example, the terminal security capability is that the terminal supports a user plane encryption algorithm 1, the user plane encryption algorithm 2, a user plane integrity protection algorithm 3, and a user plane integrity protection algorithm 5.

Steps 604: The TgNB determines a first user plane protection algorithm.

Specifically, the TgNB may determine the first user plane protection algorithm based on the correspondence between user plane information and a security policy, the terminal security capability, and a security capability priority list preconfigured by the TgNB.

The security capability priority list is a preconfigured list. A signaling plane and a user plane may share a same security capability priority list, or may use different security capability priority lists. The TgNB includes at least two security capability priority lists. That the user plane and the signaling plane share a security capability priority list is used as an example. The TgNB includes an encryption algorithm priority list and an integrity protection algorithm priority list. For example, the encryption algorithm priority list is Table 1, the integrity protection algorithm priority list is Table 2, and algorithms in the tables are arranged in descending order of priorities.

TABLE 1

| Encryption algorithm 1 |
| --- |
| Encryption algorithm 2 |
| Encryption algorithm 3 |
| Encryption algorithm 4 |
| Encryption algorithm 5 |

TABLE 2

| Integrity protection algorithm 1 |
| --- |
| Integrity protection algorithm 2 |
| Integrity protection algorithm 3 |
| Integrity protection algorithm 4 |
| Integrity protection algorithm 5 |

If the security policy is used to indicate an activated security protection type, a method for determining the first user plane protection algorithm is as follows:

For example, the correspondence between user plane information and a security policy is {{PDU session ID=1, 10, DRB ID=1}, {PDU session ID=2. QFI=1, 01, DRB ID=2}}. The terminal security capability is that the terminal supports a user plane encryption algorithm 1, a user plane encryption algorithm 2, a user plane integrity protection algorithm 3, and a user plane integrity protection algorithm 5.

First, the TgNB determines that the user plane encryption protection needs to be activated for a session 1, and the user plane integrity protection is not activated, then determines, based on the terminal security capability, that a user plane encryption algorithm supported by the terminal is the user plane encryption algorithm 1 and the user plane encryption algorithm 2, and further determines, according to Table 1, that a priority of the user plane encryption algorithm 1 is higher than a priority of the user plane encryption algorithm 2. In other words, the user plane encryption algorithm 1 is a user plane encryption algorithm that is supported by both the terminal and the TgNB and that has a highest priority. To be specific, a first user plane protection algorithm determined by the TgNB for the session 1 is the user plane encryption algorithm 1.

The TgNB determines that the user plane encryption protection is not activated but the user plane integrity protection is activated for a session 2, then determines, based on the terminal security capability, that a user plane integrity protection algorithm supported by the terminal is the user plane integrity protection algorithm 3 and the user plane integrity protection algorithm 5, and further determines, according to Table 2, that the user plane integrity protection algorithm 3 is a user plane integrity protection algorithm that is supported by both the terminal and the TgNB and that has a highest priority. To be specific, a first user plane protection algorithm determined by the TgNB for the session 2 is the user plane integrity protection algorithm 3.

If the security policy includes a user plane protection algorithm identifier, a method for determining the first user plane protection algorithm is as follows:

For example, the correspondence between user plane information and a security policy is {PDU session ID=1, NIA=1, NEA=2}.

First, the TgNB determines, according to the security policy, that both the user plane encryption protection and the user plane integrity protection need to be activated for a session 1. An activated user plane encryption algorithm indicated by the security policy is a user plane encryption algorithm 2, and an activated user plane integrity protection algorithm indicated by the security policy is a user plane integrity protection algorithm 1. Then, it is determined, based on the terminal security capability, that a user plane encryption algorithm supported by the terminal is a user plane encryption algorithm 1 and the user plane encryption algorithm 2, and a user plane integrity protection algorithm supported by the terminal is a user plane integrity protection algorithm 3 and a user plane integrity protection algorithm 5. It may be learned that both the terminal and the TgNB support the user plane encryption algorithm 2 indicated by the security policy, but the terminal does not support the user plane integrity protection algorithm 1 indicated by the security policy. Therefore, the TgNB needs to reselect a user plane integrity protection algorithm based on the terminal security capability and Table 2. It may be determined, according to Table 2, that the user plane integrity protection algorithm 3 is a user plane integrity protection algorithm that is supported by both the terminal and the TgNB and that has a highest priority. In other words, a first user plane protection algorithm determined by the TgNB for the session 1 is the user plane encryption algorithm 2 and the user plane integrity protection algorithm 3.

Optionally, if the security policy indicates activating neither the user plane encryption protection nor the user plane integrity protection, the TgNB may optionally determine, according to a default security policy, to activate the user plane encryption protection or the user plane integrity protection, or activate both the user plane encryption protection and the user plane integrity protection, and determine a corresponding user plane protection algorithm.

Optionally, the TgNB may directly ignore a received security policy, and determine a user plane protection algorithm according to a default security policy.

In a possible implementation, the TgNB may determine a pair of algorithms, and the pair of algorithms are used as both user plane security algorithms and signaling plane security algorithms. To be specific, in step 604, the first user plane protection algorithm determined by the TgNB may also be used as a signaling plane protection algorithm, or a signaling plane protection algorithm determined by the TgNB may also be used as the first user plane protection algorithm.

Step 605: The TgNB generates a user plane protection key according to the first user plane protection algorithm.

The TgNB may generate a user plane protection key for each user plane protection algorithm determined in step 604. For example, the first user plane protection algorithm determined by the TgNB for the session 1 is the user plane encryption algorithm 1, and the first user plane protection algorithm determined for the session 2 is the user plane integrity protection algorithm 3. In this case, the TgNB generates a user plane encryption key corresponding to the user plane encryption algorithm 1 for the session 1, and generates a user plane integrity protection key corresponding to the user plane integrity protection algorithm 3 for the session 2.

The TgNB may generate a key according to a key derivation function (KDF), an algorithm ID, and the KgNB*. A key generation method is as follows: Herein, key=KDF(algorithm ID, KgNB*), or key=KDF(algorithm ID, key 1, other parameters), or key=pseudo-random function(algorithm ID, other parameters). The other parameters may be one parameter or a plurality of parameters. For example, the other parameters may be a key parameter, or the other parameters is one or more of a key parameter, an isolation parameter (for example, a session ID, a DRB ID, a QFI), and a freshness parameter. The key generation method is applicable to both a handover scenario of the terminal and any scenario in which a base station generates a key.

Optionally, the TgNB may generate a signaling plane protection key according to the signaling plane protection algorithm if the TgNB determines the signaling plane protection algorithm in step 604.

Step 606: The TgNB sends a handover request acknowledgement (HO request Ack) message to the SgNB, and correspondingly, the SgNB receives the handover request acknowledgement message.

The handover request acknowledgement message includes a handover command (HO command) message. Optionally, the handover command message includes an RRC connection reconfiguration message. The RRC connection reconfiguration message is used to notify the terminal of a basic parameter of a target base station, for example, information such as a physical cell ID of the target base station, a frequency of the target base station, and a session resource. In this embodiment of this application, the RRC connection reconfiguration message is used to transfer the first user plane protection algorithm determined by the TgNB. Optionally, the RRC connection reconfiguration message is further used to transfer a signaling plane protection algorithm. In addition, if the first user plane protection algorithm determined in step 604 includes a user plane integrity protection algorithm, a user plane integrity protection key generated in step 605 needs to be used to perform integrity protection on the RRC connection reconfiguration message. If a signaling plane integrity protection algorithm is also determined in step 604, a signaling plane integrity key generated in step 605 is used to perform integrity protection on the RRC connection reconfiguration message regardless of whether a user plane integrity protection algorithm is determined.

Optionally, one RRC connection reconfiguration message may include a correspondence that is between user plane information and a security policy in each combination and that is received by the TgNB. For example, the correspondence that is between user plane information and a security policy and that is received by the TgNB is {{PDU session ID=1, 10, DRB ID=1}, {PDU session ID=2, QFI=1, 01, DRB ID=2}}. In this case, the RRC connection reconfiguration message of the TgNB includes a correspondence between user plane information and a security policy of a session 1 and a correspondence between user plane information and a security policy of a session 2.

An RRC connection reconfiguration message of the session 1 includes the first user plane protection algorithm determined by the TgNB for the session 1 and a session resource allocated to the session 1. The session resource may be a DRB ID. If a DRB whose DRB ID is 1 in the correspondence between user plane information and a security policy is not used, the DRB may be still used for the session 1. If the DRB is used, the TgNB recreates a DRB for the session 1, and sends a DRB identifier of the created DRB to the terminal. Optionally, the TgNB recreates a DRB for a session if the correspondence between user plane information and a security policy does not carry a DRB ID. With reference to the first user plane protection algorithm determined in step 604, the RRC connection reconfiguration message of the session 1 includes the user plane encryption algorithm 1, a DRB ID, and information used to generate the KgNB*. Likewise, an RRC connection reconfiguration message of the session 2 includes the user plane integrity protection algorithm 3, a DRB ID, and information used to generate the KgNB*.

A security policy corresponding to the session 1 indicates that the user plane integrity protection is not activated, and therefore, integrity protection is not performed on the RRC connection reconfiguration message of the session 1. A security policy corresponding to the session 2 indicates activating the user plane encryption protection, and therefore, the RRC connection reconfiguration message of the session 2 may be encrypted by using the user plane integrity protection key corresponding to the user plane integrity protection algorithm 3.

Optionally, the TgNB may generate a random number nonce-TgNB, and encrypt nonce-TgNB by using the user plane encryption algorithm 1. The RRC connection reconfiguration message of the session 1 further includes encrypted nonce-TgNB and unencrypted nonce-TgNB.

Optionally, if the TgNB determines the signaling plane protection algorithm in step 604, the TgNB may perform integrity protection on the RRC connection reconfiguration message by using a signaling plane integrity protection key, or encrypt nonce-TgNB by using a signaling plane encryption key.

Optionally, the RRC connection reconfiguration message further includes indication information, to indicate that the signaling plane protection algorithm is the same as the first user plane protection algorithm, or indicate a signaling plane protection algorithm identifier.

Step 607: The SgNB sends a handover command message to the terminal. Correspondingly, the terminal receives the handover command message.

It may be understood that the SgNB forwards the handover command message in the handover request acknowledgement message to the terminal after receiving the handover request acknowledgement message.

Optionally, after receiving the handover request acknowledgement message, the SgNB may send, to the TgNB, sequence number status information and data to be sent to the terminal, so that after establishing a communication link with the terminal, the TgNB forwards the data to be sent to the terminal.

Step 608: The terminal generates the user plane protection key.

The terminal obtains the RRC connection reconfiguration message from the handover command message after receiving the handover command message. If the RRC connection reconfiguration message includes a user plane integrity protection algorithm, the terminal generates a user plane integrity protection key according to the user plane integrity protection algorithm, and performs integrity verification on the RRC connection reconfiguration message by using the user plane integrity protection key. If the verification fails, the terminal breaks a communication connection with the TgNB or performs step 609; or if the verification succeeds, the terminal generates a user plane protection key corresponding to a user plane protection algorithm in the RRC connection reconfiguration message.

If the RRC connection reconfiguration message includes encrypted nonce-TgNB and a user plane encryption algorithm, the terminal generates a user plane encryption key according to the user plane encryption algorithm, decrypts encrypted nonce-TgNB by using the user plane encryption algorithm, and compares nonce-TgNB obtained through decryption with nonce-TgNB in the handover command message. If nonce-TgNB obtained through decryption is the same as nonce-TgNB in the handover command message, the terminal generates a user plane protection key corresponding to a user plane protection algorithm in the RRC connection reconfiguration message, or if nonce-TgNB obtained through decryption is different from nonce-TgNB in the handover command message, the terminal breaks a communication connection with the TgNB or performs step 609.

Optionally, the terminal generates a signaling plane protection key according to a signaling plane protection algorithm if the RRC connection reconfiguration message includes the signaling plane protection algorithm.

Step 609: The terminal accesses the TgNB.

A process in which the terminal accesses the TgNB includes that the terminal sends a synchronization request to the TgNB, and the TgNB allocates a time window to the terminal. For a specific implementation, refer to an existing procedure. Details are not described herein.

It should be noted that step 609 is not performed if the verification performed by the terminal fails in step 608.

Step 610: The terminal sends a handover confirm (HO confirm) message to the TgNB.

The handover confirm message includes an RRC connection reconfiguration complete message, and the message is used to inform the TgNB that the terminal is successfully handed over.

Optionally, if the verification performed by the terminal on the RRC connection reconfiguration message fails in step 608, the RRC connection reconfiguration complete message is used to inform the TgNB that the terminal fails to be handed over and inform the TgNB of a handover failure reason.

It should be noted that, optionally, if the terminal generates the user plane encryption key in step 608, the terminal encrypts the RRC connection reconfiguration complete message by using the user plane encryption key; if the terminal generates the user plane integrity protection key, the terminal performs integrity protection on the RRC connection reconfiguration complete message by using the user plane integrity protection key; or if the terminal generates both the user plane encryption key and the user plane integrity protection key, the terminal may perform either protection on the RRC connection reconfiguration complete message, or not only encrypt the RRC connection reconfiguration complete message by using the user plane encryption key, but also perform integrity protection on the RRC connection reconfiguration complete message by using the user plane integrity protection key.

If the terminal generates the signaling plane integrity protection key, the terminal performs integrity protection on the RRC connection reconfiguration complete message by using the signaling plane integrity protection key, or if the terminal generates the signaling plane encryption key, the terminal encrypts the RRC connection reconfiguration complete message by using the signaling plane encryption key. If the terminal generates both the signaling plane encryption key and the signaling plane integrity protection key, the terminal may perform either protection on the RRC connection reconfiguration complete message, or not only perform integrity protection on the RRC connection reconfiguration complete message by using the signaling plane integrity protection key, but also encrypt the RRC connection reconfiguration complete message by using the signaling plane encryption key.

Optionally, the terminal may further generate a random number nonce-UE, encrypt nonce-UE∥nonce-TgNB by using the user plane encryption key, add encrypted nonce-UE∥nonce-TgNB and unencrypted nonce-UE to the RRC connection reconfiguration complete message, and send the RRC connection reconfiguration complete message to the TgNB.

Optionally, if the terminal generates the user plane protection key, the terminal may protect the RRC connection reconfiguration complete message by using the user plane protection key.

Step 611: The TgNB receives the handover confirm message.

It may be understood that after the TgNB receives the handover confirm message, if the RRC connection reconfiguration complete message in the handover confirm message is a cipher text, the TgNB decrypts the RRC connection reconfiguration complete message by using the user plane encryption key; or if the RRC connection reconfiguration complete message is a message protected by using the user plane integrity protection algorithm, the TgNB performs integrity verification on the RRC connection reconfiguration complete message by using the user plane integrity protection key.

Optionally, if the RRC connection reconfiguration complete message carries encrypted nonce-UE∥nonce-TgNB, the TgNB decrypts encrypted nonce-UE∥nonce-TgNB by using the user plane encryption key, to obtain nonce-UE from encrypted nonce-UE∥nonce-TgNB, and compares nonce-UE with a plaintext nonce-UE carried in the RRC connection reconfiguration complete message. The verification succeeds if nonce-UE and the plaintext nonce-UE are the same.

Optionally, if the TgNB has informed the terminal of the signaling plane protection algorithm, the TgNB performs decryption or integrity verification on the RRC connection reconfiguration complete message by using the signaling plane protection key.

Step 612 is performed if the verification performed by the TgNB on the RRC connection reconfiguration complete message succeeds and the RRC connection reconfiguration complete message is used to inform the TgNB that the terminal is successfully handed over.

If the verification performed by the TgNB on the RRC connection reconfiguration complete message fails, or the verification performed by the TgNB on the RRC connection reconfiguration complete message succeeds, but the RRC connection reconfiguration complete message is used to inform the TgNB that the terminal fails to be handed over, the TgNB breaks a communication connection with the terminal, and deletes stored downlink data to be forwarded to the terminal.

Step 612: The TgNB sends downlink data to the terminal.

Figure 7A:
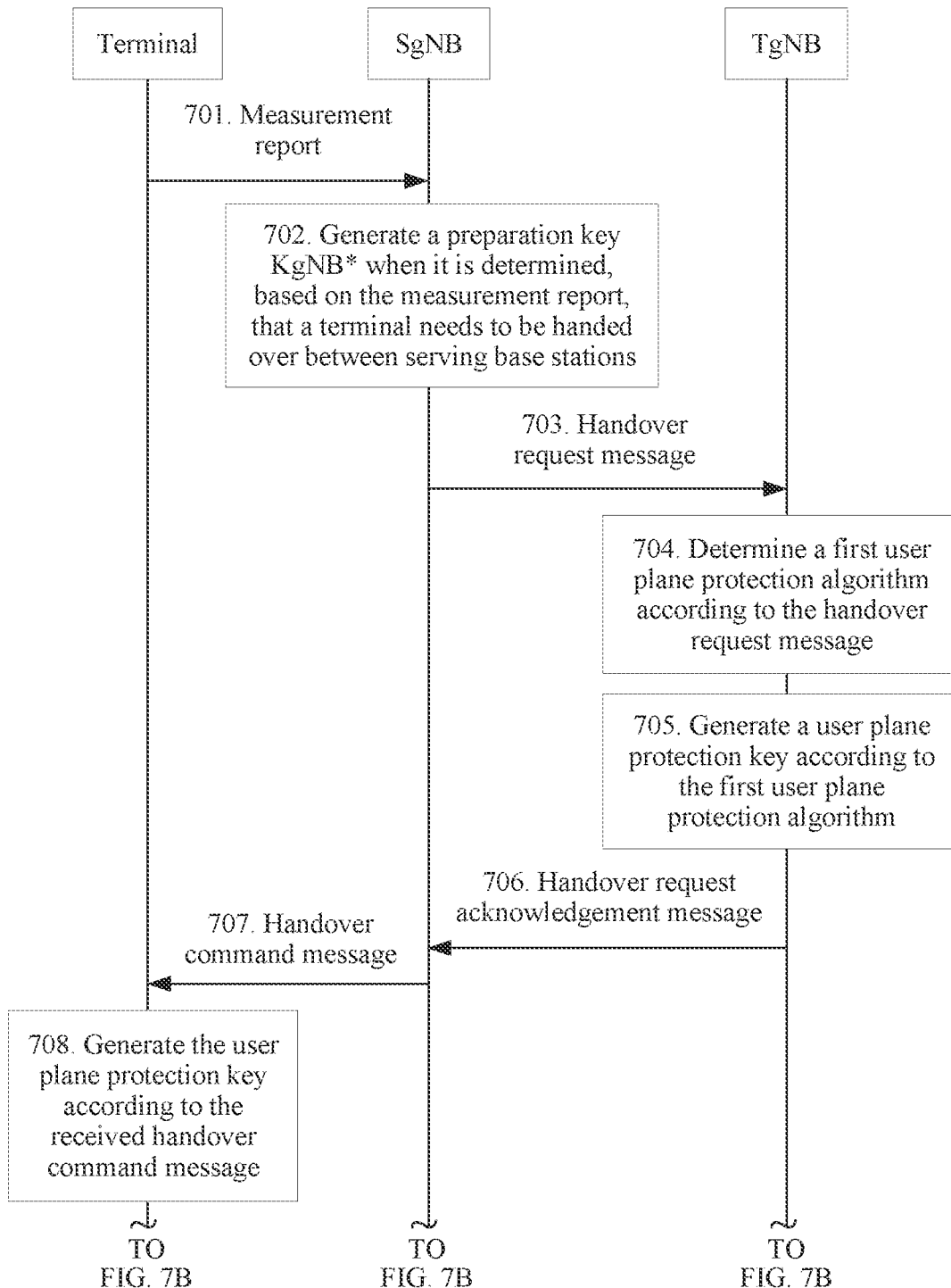
FIG. 7A and FIG. 7B are a flowchart of another security protection method according to an embodiment of this application.
Figure 7B:
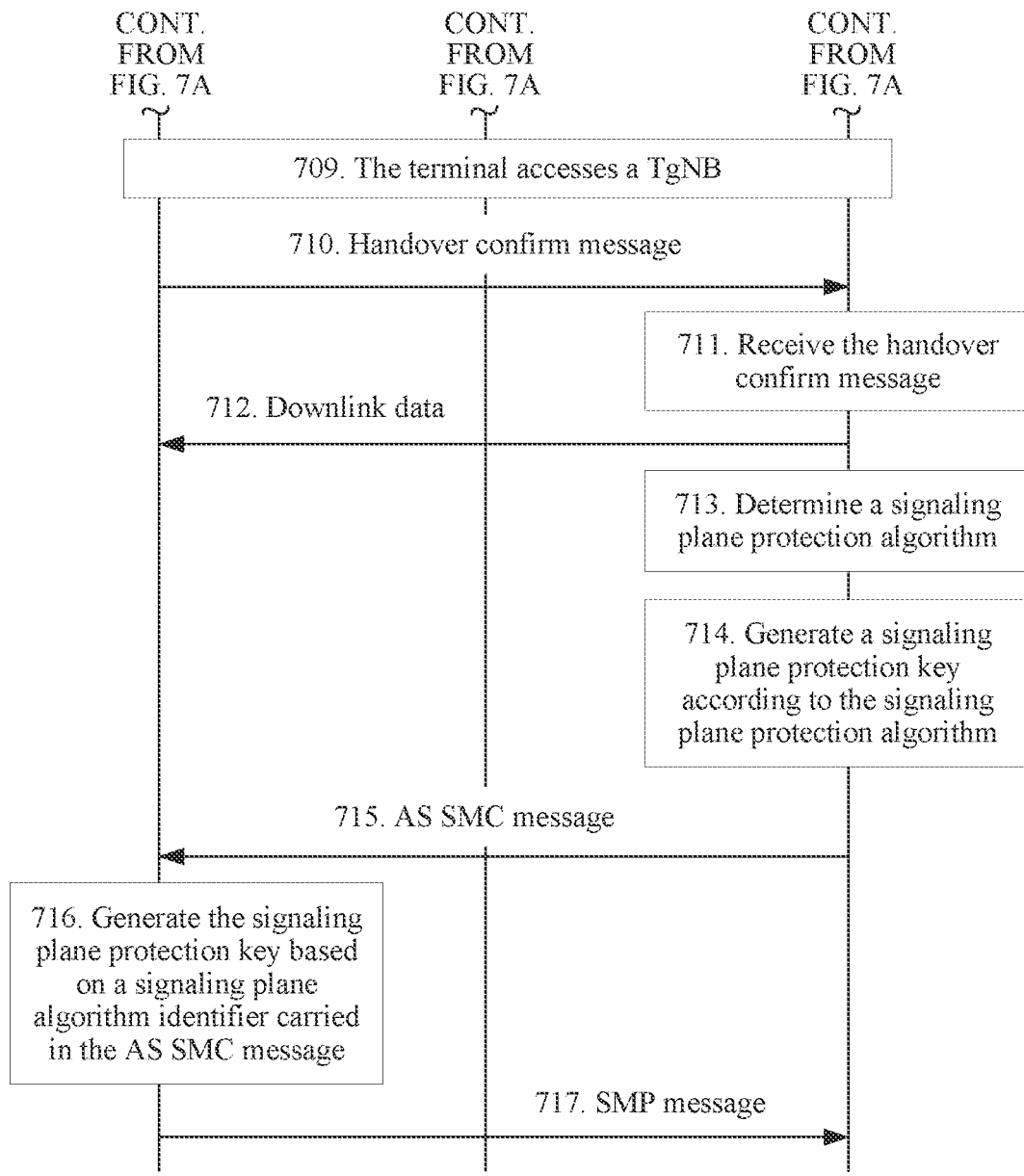

Optionally, if the TgNB does not determine the first user plane protection algorithm as the signaling plane protection algorithm or the TgNB does not determine the signaling plane protection algorithm in step 604, the TgNB needs to determine the signaling plane protection algorithm when the TgNB needs to send a signaling plane message. As shown in FIG. 7A and FIG. 7B, the method includes steps 701 to 717.

For steps 701 to 712, refer to related descriptions in steps 601 to 612. It should be noted that the TgNB neither determines a first user plane protection algorithm as a signaling plane protection algorithm nor generates a signaling plane protection key in steps 701 to 712.

713. The TgNB determine a signaling plane protection algorithm.

The signaling plane protection algorithm includes one or both of a signaling plane encryption algorithm and a signaling plane integrity protection algorithm.

A trigger occasion of step 713 is described in step 305, and is not described herein again.

714. The TgNB generates a signaling plane protection key according to the signaling plane protection algorithm.

The signaling plane protection key includes one or both of a signaling plane encryption key and a signaling plane integrity protection key.

It may be understood that when sending a signaling plane message, the TgNB may protect the signaling plane message by using the signaling plane protection key, and further send the signaling plane message protected by using the signaling plane protection key.

715. The TgNB sends an access stratum security mode command (AS SMC) message to the terminal. Correspondingly, the terminal receives the AS SMC message.

The AS SMC message carries an identifier of the signaling plane protection algorithm determined by the TgNB in step 713.

If the TgNB generates the signaling plane integrity protection key in step 714, the AS SMC message sent by the TgNB to the terminal is a message protected by using the signaling plane integrity key.

716. The terminal generates the signaling plane protection key based on a signaling plane protection algorithm identifier carried in the AS SMC message.

The signaling plane protection key generated by the terminal includes one or both of a signaling plane encryption key and a signaling plane integrity protection key. The terminal generates the signaling plane encryption key based on a signaling plane encryption algorithm identifier if the AS SMC message carries only the signaling plane encryption algorithm identifier; or the terminal generates the signaling plane integrity protection key based on a signaling plane integrity protection algorithm identifier if the AS SMC message carries only the signaling plane integrity protection algorithm identifier; or the terminal generates the signaling plane encryption key based on a signaling plane encryption algorithm identifier and generates the signaling plane integrity protection key based on a signaling plane integrity protection algorithm identifier if the AS SMC message carries the signaling plane encryption algorithm identifier and the signaling plane integrity protection algorithm identifier.

Optionally, the terminal may perform integrity verification on the AS SMC message based on the generated signaling plane integrity protection key if the AS SMC message carries the signaling plane integrity protection algorithm identifier.

717. The terminal sends a security mode complete (SMP) message to the TgNB.

Optionally, the SMP message is a message on which the terminal performs integrity protection by using the signaling plane integrity protection key.

Optionally, steps 713 to 717 may be performed before step 710. If steps 713 to 717 are performed before step 710, the terminal sends a handover confirm message protected by using the signaling plane integrity protection key to the TgNB in step 710.

According to this embodiment, a user plane protection activating process may be decoupled from a signaling plane protection activating process. The TgNB may not activate signaling plane protection when the TgNB does not need to send a signaling plane message, to reduce network overheads of the TgNB, and improve handover efficiency of the terminal. If the TgNB needs to transmit a signaling plane message after the terminal is successfully handed over, the TgNB may determine the signaling plane protection algorithm, generate the signaling plane protection key, and perform security protection on the signaling plane message by using the signaling plane protection key, to ensure signaling plane security.

Figure 8:
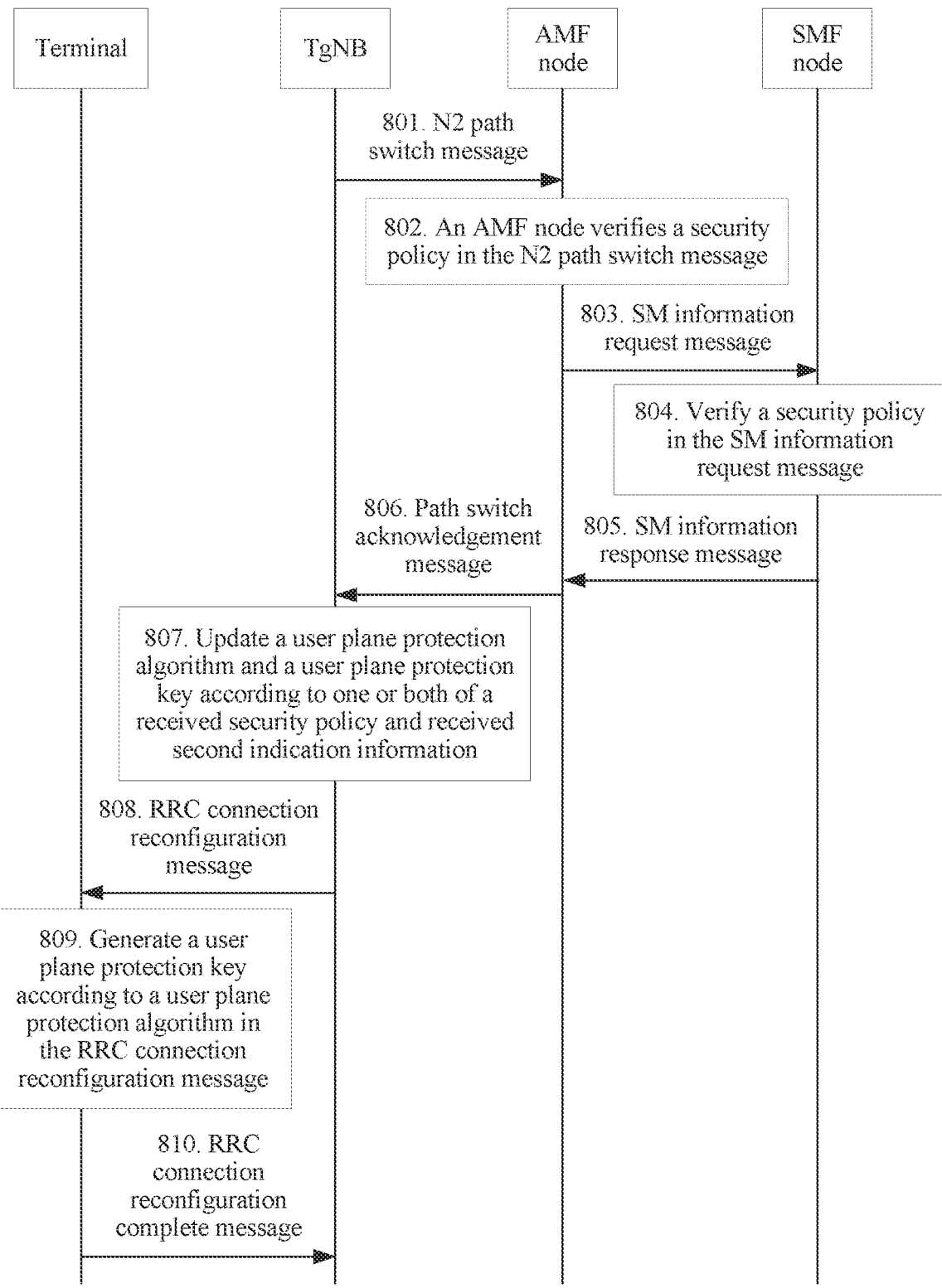
FIG. 8 is a flowchart of another security protection method according to an embodiment of this application.

Optionally, in a possible implementation of the embodiments of this application, in step 611, a handover process of the terminal is completed after the TgNB receives the handover confirm message. Further, a security policy currently used by the TgNB may be verified. As shown in FIG. 8, the method specifically describes the embodiment corresponding to FIG. 4, and the method includes steps 801 to 810.

Step 801: A TgNB sends an N2 path switch (N2 path switch) message to an AMF node. Correspondingly, the AMF node receives the N2 path switch message.

The N2 path switch message includes a correspondence between user plane information and a security policy from an SgNB.

Optionally, the N2 path switch message includes a default security policy and user plane information if the TgNB determines a first user plane protection algorithm by using the default security policy instead of the correspondence between user plane information and a security policy.

Optionally, the N2 path switch message includes a session management (SM) container. The SM container includes the correspondence between user plane information and a security policy from the SgNB, or the SM container includes the default security policy and the user plane information. Only an SMF node may read information in the SM container.

Step 802: The AMF node verifies a security policy in the N2 path switch message.

When the N2 path switch message does not carry the SM container or there is user plane information and a security policy outside the SM container, step 802 is performed only if the AMF node determines that the AMF node stores each correspondence between user plane information and a security policy, or step 802 is skipped and step 803 is directly performed if the AMF node determines that the AMF node does not store each correspondence between user plane information and a security policy.

For example, the correspondence that is between user plane information and a security policy and that is stored by the AMF node is shown in Table 3.

TABLE 3

| User plane information | Security policy |
|---|---|
| PDU session ID = 1 | NIA 1, NEA2 |
| PDU session ID = 2 | NIA 3, "1111" |
| PDU session ID = 3 | NIA 2, NEA 1 |

A NIA is a user plane integrity protection algorithm, and a NEA is a user plane encryption algorithm. For example, the NIA 1 represents that an algorithm identifier of a user plane integrity protection algorithm is 1. "1111" replaces an NEA location, and is used to indicate that the user plane encryption protection is not activated.

If the correspondence between user plane information and a security policy in the N2 path switch message is {PDU session ID=1, NIA=1, NEA=2}, the AMF node searches Table 3 for a security policy whose PDU session ID is 1. Referring to Table 3, a found security policy is "NIA 1, NEA 2", and is the same as a security policy in {PDU session ID=1, NIA=1, NEA=2}. In this case, verification succeeds, and it indicates that the TgNB can continue using a first user plane protection algorithm determined based on the correspondence between user plane information and a security policy. Step 806 may be performed to inform the TgNB of a verification result.

If the correspondence between user plane information and a security policy in the N2 path switch message is {PDU session ID=2, NIA=2, NEA=2}, the AMF node searches Table 3 for a security policy whose PDU session ID is 2. Referring to Table 3, a found security policy is "NIA 3, "11111"", and is different from a security policy in {PDU session TD=2, NIA=2, NEA=2}. In this case, verification fails, and it indicates that the TgNB cannot continue using a first user plane protection algorithm determined based on the correspondence between user plane information and a security policy, and needs to update the currently used security policy to the security policy "NIA 3, "1111"" obtained through searching Table 3. Step 806 may be further performed to inform the TgNB of a verification result.

For example, the correspondence that is between user plane information and a security policy and that is stored by the AMF node may also be shown in Table 4.

TABLE 4

| User plane information | Security policy |
|---|---|
| PDU session ID = 1 | 01 |
| PDU session ID = 2 | 10 |
| PDU session ID = 3 | 11 |

"01" indicates not activating user plane encryption protection but activating user plane integrity protection; "10" indicates activating user plane encryption protection but not activating user plane integrity protection; and "11" indicates activating user plane encryption protection and activating user plane integrity protection.

If the correspondence between user plane information and a security policy in the N2 path switch message is {PDU session ID=1, 11}, and a security policy corresponding to "PDU session ID=1" is "01" in Table 3, verification fails and it indicates that the TgNB cannot continue using a first user plane protection algorithm determined based on the correspondence between user plane information and a security policy. The AMF node needs to perform step 806, to inform the TgNB of the security policy "01" corresponding to "PDU session ID=1" in Table 3.

Step 803: The AMF node sends a session management information request (SM information request) message to an SMF node. Correspondingly, the SMF node receives the SM information request message from the AMF node.

The SM information request message includes identity information of a terminal and the correspondence between user plane information and a security policy from the SgNB, or includes identity information of a terminal, the user plane information, and the default security policy.

Optionally, the AMF node may add the SM container in the N2 path switch message to the SM information request message, and send the SM information request message to the SMF node.

Step 804: The SMF node verifies a security policy in the SM information request message.

If the SM information request message carries the SM container, the SMF node reads, from the SM container, the correspondence between user plane information and a security policy from the SgNB or the user plane information and the default security policy.

Optionally, the SMF node stores each correspondence between user plane information and a security policy, as shown in Table 3 or Table 4. A method for verifying the security policy by the SMF node is basically the same as the method for verifying the security policy by the AMF node in step 802. A difference is that the SMF node sends a verification result to the AMF node after completing verification on the security policy.

Step 805: The SMF node sends an SM information response (SM information response) message to the AMF node.

The SM information response message carries the result of the verification performed by the SMF node on the security policy in step 804, and specifically carries one or both of the security policy and second indication information.

If the verification succeeds in step 804, the security policy in the SM information response message is the security policy in the SM information request message, or the second indication information is used to indicate that a currently used security policy can continue being used. For example, the security policy in the SM information response message may be "NIA=1, NEA=2" in (PDU session ID=1. NIA=1, NEA=2).

If the verification fails in step 804, the security policy in the SM information response message is a security policy reselected by the SMF node based on the user plane information, or the second indication information is used to indicate that a currently used security policy cannot continue being used. For example, the security policy in the SM information response message may be "NIA 3, "1111"".

Optionally, the SM information response message may further carry the user plane information corresponding to the security policy.

Step 806: The AMF node sends a path switch acknowledgement (path switch ack) message to the TgNB. Correspondingly, the TgNB receives the path switch acknowledgement message.

If step 802 is performed, the path switch acknowledgement message carries the result of the verification performed by the AMF node on the security policy in step 802, and specifically carries one or both of the security policy and second indication information.

If the verification succeeds in step 802, the security policy in the path switch acknowledgement message is the security policy in the SM information request message, or the second indication information is used to indicate that a currently used security policy can continue being used. For example, the security policy in the path switch acknowledgement message may be "NIA=1, NEA=2" in {PDU session ID=1, NIA=1, NEA=2}.

If the verification fails in step 802, the security policy in the path switch acknowledgement message is a security policy reselected by the SMF node based on the user plane information, or the second indication information is used to indicate that a currently used security policy cannot continue being used. For example, the security policy in the path switch acknowledgement message may be "NIA 3, "1111"".

Optionally, the path switch acknowledgement message may further carry the user plane information corresponding to the security policy.

If step 802 is not performed, the path switch acknowledgement message includes content in the SM information response message sent by the SMF node.

Step 807: The TgNB updates a user plane protection algorithm and a user plane protection key according to one or both of a received security policy and received second indication information.

After receiving the security policy in the path switch acknowledgement message, the TgNB determines whether the received security policy is the same as a security policy from the SgNB. If the received security policy is the same as the security policy from the SgNB, the TgNB does not need to update the user plane protection algorithm and the user plane protection key; or if the received security policy is different from the security policy from the SgNB, the TgNB reselects a user plane protection algorithm according to the security policy in the path switch acknowledgement message, and generates a user plane protection key according to the reselected user plane protection algorithm.

If the path switch acknowledgement message does not carry the security policy and carries the second indication information, and the second indication information indicates that the currently used security policy can continue being used, the TgNB does not need to update the user plane protection algorithm and the user plane protection key; or if the second indication information indicates that the currently used security policy cannot be used, the TgNB uses the default security policy, or the TgNB breaks a connection, or the TgNB breaks a connection after sending downlink data.

Optionally, after updating the user plane protection algorithm and the user plane protection key, the TgNB needs to send a signaling plane message to the terminal. If signaling plane protection is not activated in this case, steps 713 to 717 are performed to activate signaling plane protection.

Step 808: The TgNB sends an RRC connection reconfiguration message to a terminal. Correspondingly, the terminal receives the RRC connection reconfiguration message from the TgNB.

The RRC connection reconfiguration message is a message protected by using a signaling plane protection key, and the RRC connection reconfiguration message carries an updated user plane protection algorithm of the TgNB or third indication information. The third indication information is used to indicate whether the terminal can continue using a user plane protection algorithm currently used by the terminal.

Step 809: The terminal generates a user plane protection key according to a user plane protection algorithm in the RRC connection reconfiguration message.

It may be understood that the terminal may perform security verification on the RRC connection reconfiguration message based on the signaling plane protection key, for example, may perform integrity verification on the RRC connection reconfiguration message based on a signaling plane integrity protection key. If the verification succeeds, the terminal may generate the user plane protection key according to the user plane protection algorithm in the RRC connection reconfiguration message, and subsequently encrypt or decrypt user plane data by using the user plane protection key.

Step 810: The terminal sends an RRC connection reconfiguration complete message to the TgNB. Correspondingly, the TgNB receives the RRC connection reconfiguration complete message.

It may be understood that, when receiving the RRC connection reconfiguration complete message, the TgNB may determine that the user plane protection algorithm is successfully updated.

Figure 9:
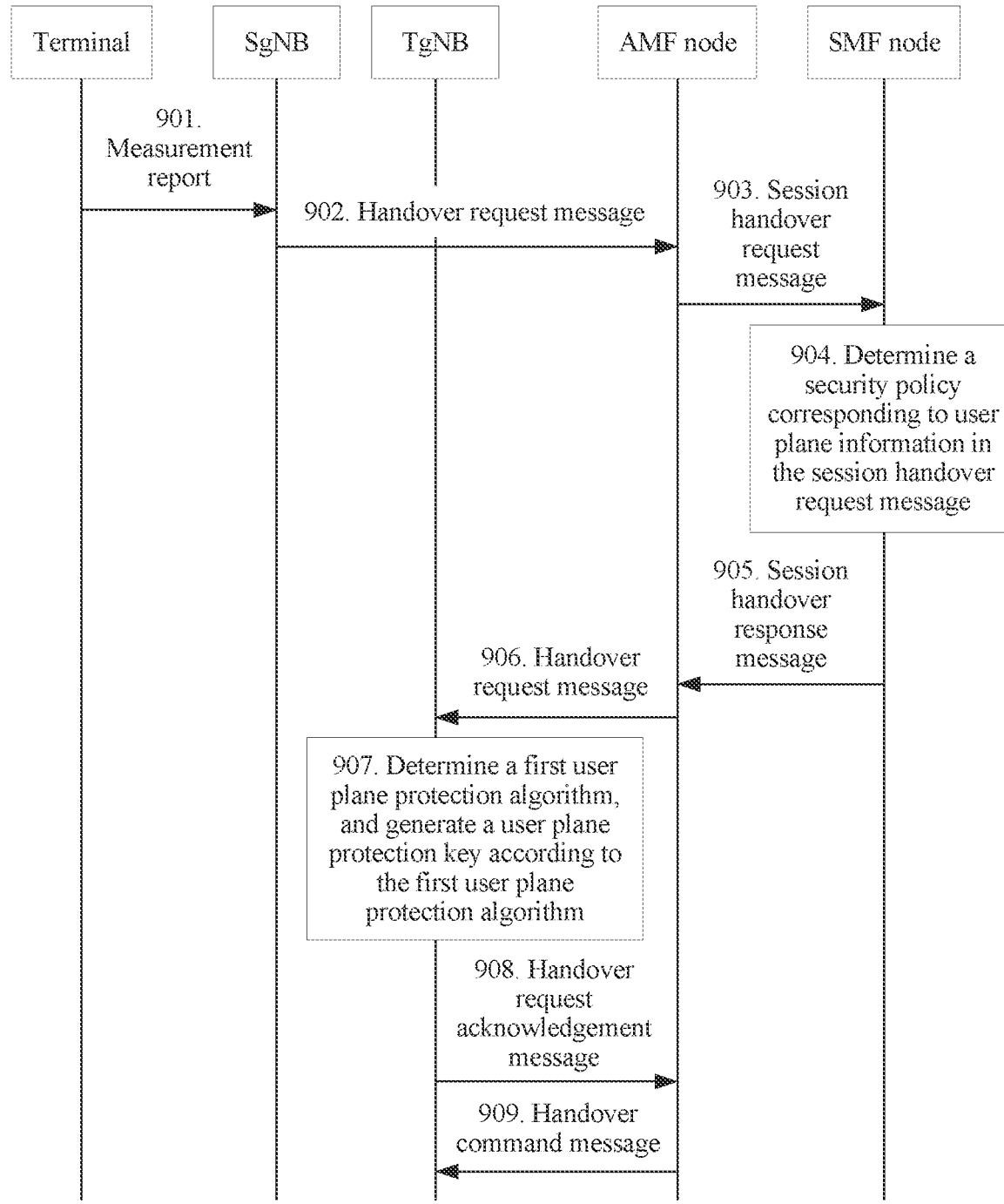
FIG. 9 is a flowchart of another security protection method according to an embodiment of this application.

Optionally, in a handover procedure of a terminal, if there is no communications interface between an SgNB and a TgNB, the handover procedure of the terminal is shown in FIG. 9. The method includes steps 901 to 909.

Step 901: The terminal sends a measurement report to the SgNB. Correspondingly, the SgNB receives the measurement report.

Step 902: The SgNB sends a handover request message to an AMF node when determining, based on the measurement report, that the terminal needs to be handed over between serving base stations. Correspondingly, the AMF node receives the handover request message.

The handover request message includes a correspondence between user plane information and a security policy, and may further include a terminal security capability.

Optionally, the handover request message may include an SM container. The SM container includes the correspondence between user plane information and a security policy or includes only a security policy, or a security policy is outside the SM container, or there is a security policy inside and outside the SM container.

Optionally, if the correspondence between user plane information and a security policy is outside the SM container in the handover request message, and the AMF node stores each correspondence between user plane information and a security policy, for example, the AMF node stores Table 3, the AMF node may determine whether a security policy corresponding to user plane information in the handover request message is the same as a security policy corresponding to the user plane information in Table 3. The AMF node may directly send the security policy corresponding to the user plane information to the TgNB if the two security policies are the same, or the AMF node performs step 903 if the two security policies are different.

Optionally, step 903 is performed if there is no correspondence between user plane information and a security policy outside the SM container in the handover request message.

Step 903. The AMF node sends a session handover request message to an SMF node, where the session handover request message carries user plane information. Correspondingly, the SMF node receives the session handover request message.

Optionally, the session handover request message further includes the correspondence between user plane information and a security policy, or further includes the SM container received in step 902.

Step 904: The SMF node determines a security policy corresponding to the user plane information in the session handover request message.

The SMF node stores or may obtain the correspondence between user plane information and a security policy. For example, refer to Table 3 or Table 4. Table 3 is used as an example. If the user plane information in the session handover request message is "PDU session ID=1", the SMF node may determine that the security policy is "NIA 1, NEA 2" (using a user plane integrity protection algorithm 1 and using a user plane encryption algorithm 2).

Optionally, if the SMF node receives the correspondence between user plane information and a security policy or receives the SM container, and the SM container includes the correspondence between user plane information and a security policy, the SMF node may determine whether the security policy corresponding to the received user plane information is the same as a security policy corresponding to the user plane information in Table 3. If the two security policies are the same, it is determined that a security policy from the SgNB can be still used for a subsequent handover procedure of the terminal; or if the two security policies are different, it is determined that the security policy corresponding to the user plane information in Table 3 is used for a subsequent handover procedure of the terminal.

Optionally, the SMF node receives only the user plane information or receives the SM container, and the SM container includes only the user plane information. In this case, the SMF node needs to determine the security policy for the user plane information.

Optionally, the SMF node receives the correspondence between user plane information and a security policy or receives the SM container, and the SM container includes the correspondence between user plane information and a security policy. In this case, the SMF node ignores a received security policy, and redetermines the security policy corresponding to the user plane information based on the user plane information. Specifically, the SMF node may determine the security policy corresponding to the user plane information based on each correspondence that is between user plane information and a security policy and that is preconfigured by the SMF node or that is obtained from another network element.

Step 905: The SMF node sends a session handover response message to the AMF node.

The session handover response message includes the security policy that is corresponding to the user plane information and that is determined by the SMF node.

Step 906: The AMF node sends a handover request message to the TgNB. Correspondingly, the TgNB receives the handover request message.

The handover request message includes the security policy corresponding to the user plane information and the terminal security capability. Optionally, the AMF node further needs to forward the SM container to the TgNB if the AMF node receives the SM container.

Optionally, to improve handover efficiency of the terminal, the handover request message may not include the security policy corresponding to the user plane information, and only the SM container includes a security policy corresponding to user plane information from the SgNB. Therefore, the TgNB may temporarily use the security policy in the SM container. After the terminal completes the handover procedure, the TgNB may request the AMF node or the SMF node to deliver a new security policy in a subsequent PDU session procedure, or the SMF delivers a security policy to the TgNB when the terminal initiates a session establishment or session modification request.

Steps 907: The TgNB determines a first user plane protection algorithm, and generates a user plane protection key according to the first user plane protection algorithm.

It should be noted that a specific implementation method of step 907 is the same as related descriptions in steps 604 and 605. Details are not described herein again.

Step 908: The TgNB sends a handover request acknowledgement message to the AMF node. Correspondingly, the AMF node receives the handover request acknowledgement message from the TgNB.

Step 909: The AMF node sends a handover command message to the TgNB. Correspondingly, the TgNB receives the handover command message from the AMF node.

For a subsequent procedure, refer to related descriptions in steps 608 to 612. Certainly, this application is not limited thereto.

The solutions provided in the embodiments of the present disclosure are mainly described above from a perspective of interaction between different network elements. It may be understood that to implement the foregoing functions, the first access network device, the second access network device, the AMF node, the SMF node, and the terminal include corresponding hardware structures and/or software modules for performing the functions. With reference to units and algorithm steps of each example described in the embodiments disclosed in the present disclosure, the embodiments of the present disclosure can be implemented in a form of hardware or a combination of hardware and computer software. Whether a function is implemented by hardware or in a manner of driving hardware by a computer software depends on a particular application and a design constraint condition of the technical solutions. A person skilled in the art may use different methods for each particular application to implement the described functions, but it should not be considered that the implementation goes beyond the scope of the technical solutions of the embodiments of the present disclosure.

In the embodiments of the present disclosure, functional unit division may be performed on the first access network device, the second access network device, the AMF node, the SMF node, the terminal, and the like based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that unit division in the embodiments of the present disclosure is an example, and is merely logical function division. There may be another division manner in actual implementation.

Figure 10:
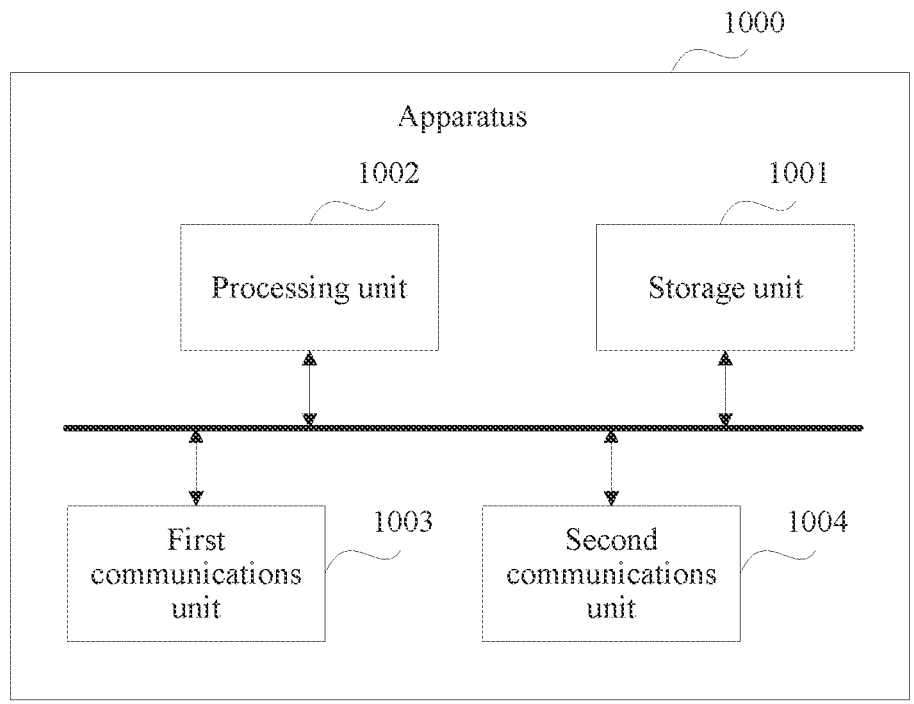
FIG. 10 is a schematic block diagram of an apparatus according to an embodiment of this application.

When an integrated unit is used, FIG. 10 is a schematic block diagram of an apparatus according to an embodiment of the present disclosure. The apparatus may exist in a form of software, or may be a first access network device, or may be a chip in a first access network device. The apparatus 1000 includes a processing unit 1002 and a first communications unit 1003. The processing unit 1002 is configured to control and manage an action of the apparatus 1000. For example, the processing unit 1002 is configured to support the apparatus 1000 in performing step 203 in FIG. 2, steps 303 to 306 in FIG. 3A and FIG. 3B, steps 403 and 404 in FIG. 4, steps 604, 605, and 611 in FIG. 6, steps 704, 705, 711, 713, and 714 in FIG. 7A and FIG. 7B, step 807 in FIG. 8, and step 907 in FIG. 9, and/or is configured to perform another process of the technology described in this specification. The first communications unit 1003 is configured to support communication between the apparatus 1000 and another network element (for example, a second access network device, an AMF node, or an SMF node). The apparatus 1000 may further include a second communications unit 1004, configured to support communication between the apparatus 1000 and a terminal. The apparatus 1000 may further include a storage unit 1001, configured to store program code and data of the apparatus 1000.

The processing unit 1002 may be a processor or a controller, for example, a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit 1002 can implement or execute various example logical blocks, modules, and circuits that are described with reference to the content disclosed in the present disclosure. Alternatively, the processing unit 1002 may be a combination for implementing a computing function, for example, a combination of one or more microprocessors or a combination of a DSP and a microprocessor. The first communications unit 1003 may be a communications interface, and the communications interface is a general term. In specific implementation, the communications interface may include a plurality of interfaces, for example, may include an interface between access network devices, an interface between an access network device and a core network device, and/or another interface. The second communications unit 1004 may be a transceiver, a transceiver circuit, or the like. The storage unit 1001 may be a memory.

Figure 11:
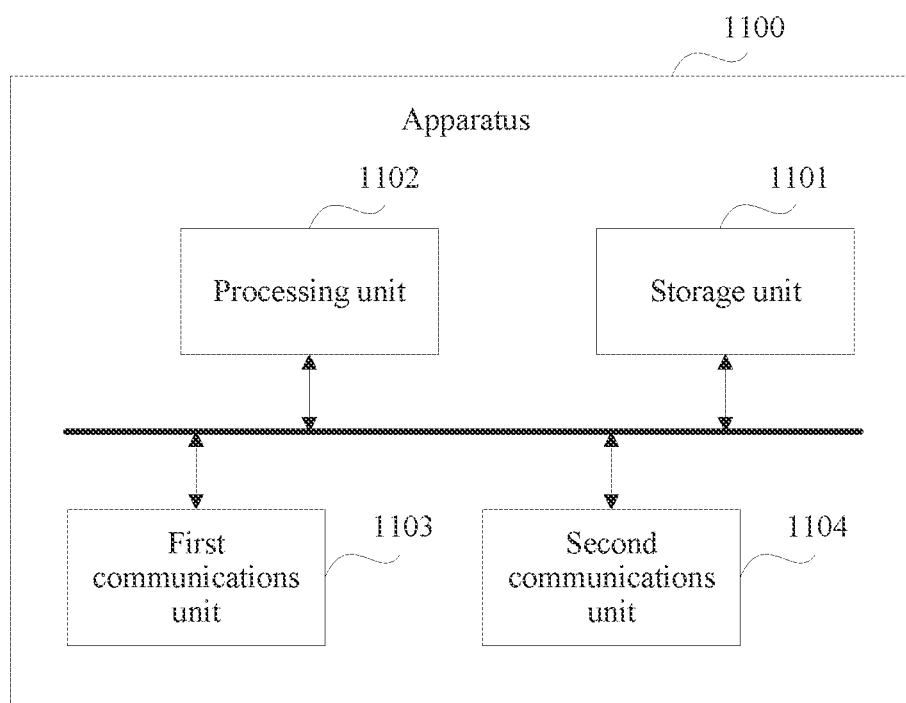
FIG. 11 is a schematic block diagram of another apparatus according to an embodiment of this application.

When an integrated unit is used, FIG. 11 is a schematic block diagram of another apparatus according to an embodiment of the present disclosure. The apparatus may exist in a form of software, or may be a second access network device, or may be a chip in a second access network device. The apparatus 1100 includes a processing unit 1102, a first communications unit 1103, and a second communications unit 1104. The processing unit 1102 is configured to control and manage an action of the apparatus 1100. For example, the processing unit 1102 is configured to support the apparatus 1100 in performing step 201 in FIG. 2, step 301 in FIG. 3A, step 602 in FIG. 6, and step 702 in FIG. 7A, and/or is configured to perform another process of the technology described in this specification. The first communications unit 1103 is configured to support communication between the apparatus 1100 and another access network device, an AMF node, or an SMF node. The second communications unit 1104 is configured to support communication between the apparatus 1100 and a terminal. The apparatus 1100 may further include a storage unit 1101, configured to store program code and data of the apparatus 1100.

The processing unit 1102 may be a processor or a controller, for example, a CPU, a general-purpose processor, a DSP, an ASIC, an FPGA or another programmable logic device, a transistor logic device, a hardware component, or any combination thereof. The processing unit 1102 can implement or execute various example logical blocks, modules, and circuits that are described with reference to the content disclosed in the present disclosure. Alternatively, the processor may be a combination for implementing a computing function, for example, a combination of one or more microprocessors or a combination of a DSP and a microprocessor. The first communications unit 1103 may be a communications interface, and the communications interface is a general term. In specific implementation, the communications interface may include a plurality of interfaces, for example, may include an interface between access network devices, an interface between an access network device and a core network device, and/or another interface. The second communications unit 1104 may be a transceiver, a transceiver circuit, or the like. The storage unit 1101 may be a memory.

Figure 12:
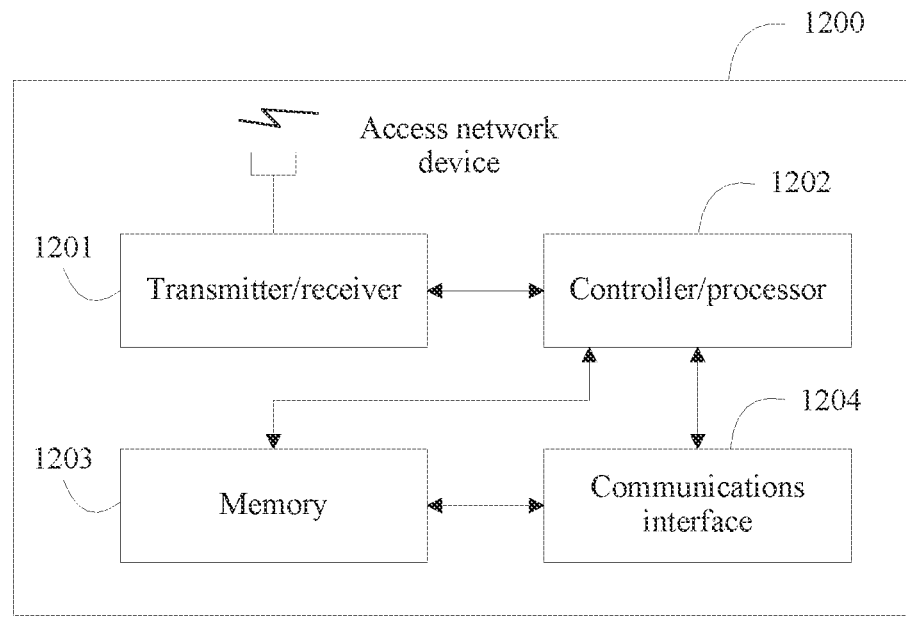
FIG. 12 is a schematic structural diagram of an access network device according to an embodiment of this application.

When the processing unit 1002 is a processor, the first communications unit 1003 is a communications interface, the second communications unit 1004 is a transmitter/receiver, and the storage unit 1001 is a memory, a structure of the apparatus 1000 in the embodiment of the present disclosure may be a structure of an access network device shown in FIG. 12. When the processing unit 1102 is a processor, the first communications unit 1103 is a communications interface, the second communications unit 1104 is a transmitter/receiver, and the storage unit 1101 is a memory, a structure of the apparatus 1100 in the embodiment of the present disclosure may be the structure of the access network device shown in FIG. 12.

FIG. 12 is a possible schematic structural diagram of an access network device according to an embodiment of the present disclosure.

The access network device 1200 includes a processor 1202 and a communications interface 1204. The processor 1202 may also be a controller, and is indicated as a "controller/processor 1202" in FIG. 12. The communications interface 1204 is configured to support communication between an access network device and another network element (for example, another access network device, an AMF node, or an SMF node). Further, the access network device 1200 may include a transmitter/receiver 1201. The transmitter/receiver 1201 is configured to support the access network device in receiving information from and sending information to the terminal in the foregoing embodiment, and support the access network device in performing radio communication with another terminal. The processor 1202 performs various functions for communication with the terminal. On an uplink, an uplink signal from the terminal is received by using an antenna, is demodulated (for example, a high frequency signal is demodulated into a baseband signal) by the receiver 1201, and is further processed by the processor 1202, to restore service data and signaling information sent by the terminal. On a downlink, service data and a signaling message are processed by the processor 1202, and are modulated (for example, a baseband signal is modulated into a high frequency signal) by the transmitter 1201, to generate a downlink signal, and the downlink signal is transmitted to the terminal by using the antenna. It should be noted that the foregoing demodulation or modulation function may be implemented by the processor 1202.

For example, when the access network device 1200 is a first access network device, the processor 1202 is further configured to perform the processing processes of the first access network device in the methods shown in FIG. 2 to FIG. 9 and/or another process of the technical solutions described in this application; or when the access network device 1200 is a second access network device, the processor 1202 is further configured to perform the processing processes of the second access network device in methods shown in FIG. 2, FIG. 3A and FIG. 3B, FIG. 6, FIG. 7A and FIG. 7B, and FIG. 9 and/or another process of the technical solutions described in this application.

Further, the access network device 1200 may include a memory 1203, and the memory 1203 is configured to store program code and data of the access network device 1200.

It may be understood that FIG. 12 shows only a simplified design of the access network device 1200. In actual application, the access network device 1200 may include any quantity of transmitters, receivers, processors, controllers, memories, communications units, and the like, and all access network devices that can implement the embodiments of the present disclosure fall within the protection scope of the embodiments of the present disclosure.

Figure 13:
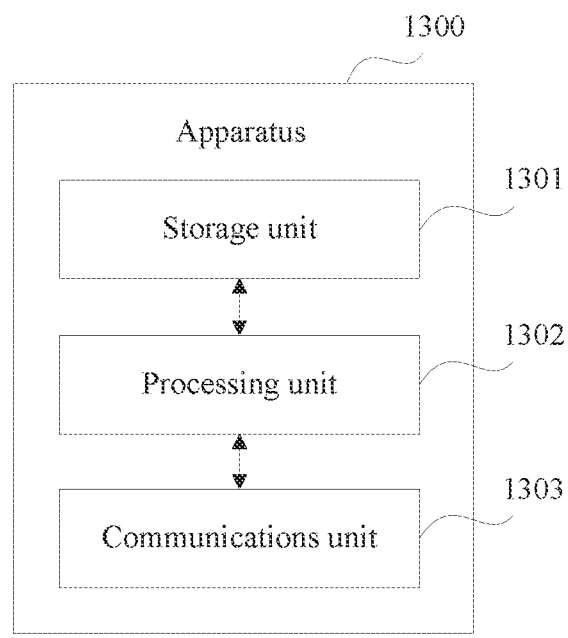
FIG. 13 is a schematic block diagram of another apparatus according to an embodiment of this application.

When an integrated unit is used, FIG. 13 is a possible example block diagram of another apparatus according to an embodiment of the present disclosure. The apparatus 1300 may exist in a form of software, or may be an AMF node, or may be a chip in an AMF node. The apparatus 1300 includes a processing unit 1302 and a communications unit 1303. The processing unit 1302 is configured to control and manage an action of the apparatus 1300. For example, the processing unit 1302 is configured to support the apparatus 1300 in performing step 802 in FIG. 8, and/or is configured to perform another process of the technology described in this specification. The communications unit 1303 is configured to support communication between the apparatus 1300 and another network entity (for example, an access network device and an SMF node). The apparatus 1300 may further include a storage unit 1301, configured to store program code and data of the apparatus 1300.

The processing unit 1302 may be a processor or a controller, for example, a CPU, a general-purpose processor, a DSP, an ASIC, an FPGA or another programmable logic device, a transistor logic device, a hardware component, or any combination thereof. The processing unit 1302 can implement or execute various example logical blocks, modules, and circuits that are described with reference to the content disclosed in the present disclosure. Alternatively, the processor may be a combination for implementing a computing function, for example, a combination of one or more microprocessors or a combination of a DSP and a microprocessor. The communications unit 1303 may be a communications interface, a transceiver, a transceiver circuit, or the like, and the communications interface is a general term. In specific implementation, the communications interface may include a plurality of interfaces, for example, may include an interface between an AMF node and an access network device and/or another interface. The storage unit 1301 may be a memory.

Figure 14:
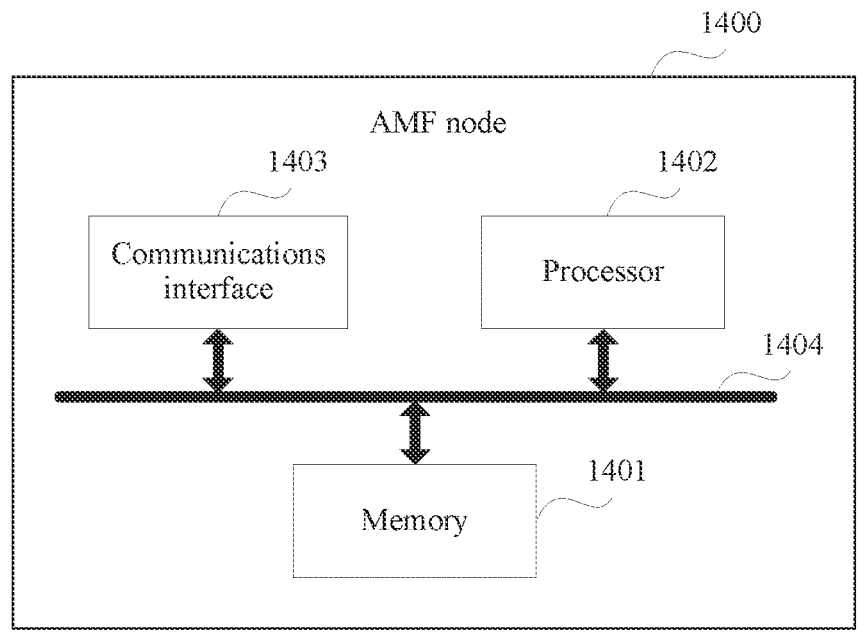
FIG. 14 is a schematic structural diagram of an AMF node according to an embodiment of this application.

When the processing unit 1302 is a processor, the communications unit 1303 is a communications interface, and the storage unit 1301 is a memory, the apparatus 1300 in this embodiment of the present disclosure may be an AMF node shown in FIG. 14.

As shown in FIG. 14, the AMF node 1400 includes a processor 1402, a communications interface 1403, and a memory 1401. Optionally, the AMF node 1400 may further include a bus 1404. The communications interface 1403, the processor 1402, and the memory 1401 may be connected to each other by using the bus 1404. The bus 1404 may be a peripheral component interconnect (PCI) bus, an extended industry standard architecture (EISA) bus, or the like. The bus 1404 may be classified into an address bus, a data bus, a control bus, and the like. For ease of indication, the bus is indicated by using only one bold line in FIG. 14. However, it does not indicate that there is only one bus or only one type of bus.

Figure 15:
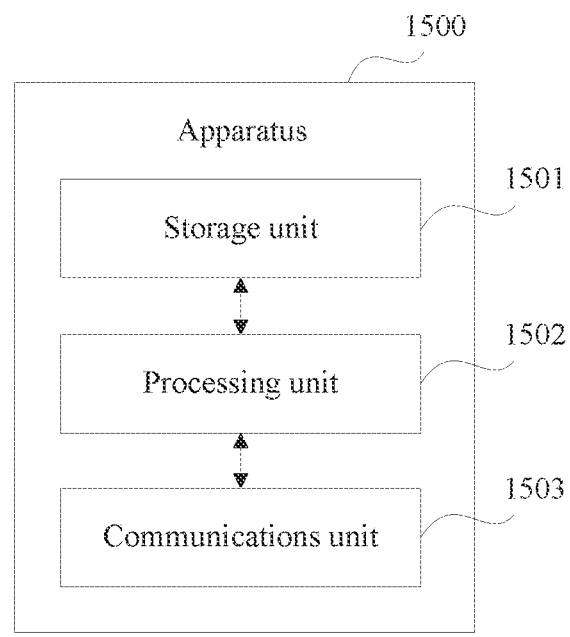
FIG. 15 is a schematic block diagram of another apparatus according to an embodiment of this application.

When an integrated unit is used, FIG. 15 is a possible example block diagram of another apparatus according to an embodiment of the present disclosure. The apparatus 1500 may exist in a form of software, or may be an SMF node, or may be a chip in an SMF node. The apparatus 1500 includes a processing unit 1502 and a communications unit 1503. The processing unit 1502 is configured to control and manage an action of the apparatus 1500. For example, the processing unit 1502 is configured to support the apparatus 1500 in performing step 503 in FIG. 5, step 804 in FIG. 8, and step 904 in FIG. 9, and/or is configured to perform another process of the technology described in this specification. The communications unit 1503 is configured to support communication between the apparatus 1500 and another network entity (for example, an access network device and an SMF node). The apparatus 1500 may further include a storage unit 1501, configured to store program code and data of the apparatus 1500.

The processing unit 1502 may be a processor or a controller, for example, a CPU, a general-purpose processor, a DSP, an ASIC, an FPGA or another programmable logic device, a transistor logic device, a hardware component, or any combination thereof. The processing unit 1502 can implement or execute various example logical blocks, modules, and circuits that are described with reference to the content disclosed in the present disclosure. Alternatively, the processor may be a combination for implementing a computing function, for example, a combination of one or more microprocessors or a combination of a DSP and a microprocessor. The communications unit 1503 may be a communications interface, a transceiver, a transceiver circuit, or the like, and the communications interface is a general term. In specific implementation, the communications interface may include a plurality of interfaces, for example, may include an interface between an SMF node and an access network device and/or another interface. The storage unit 1501 may be a memory.

Figure 16:
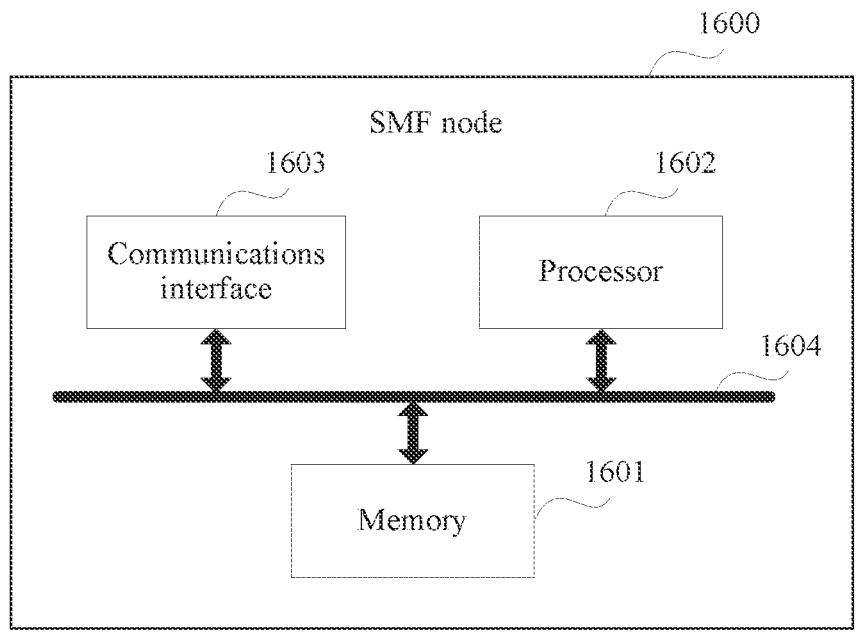
FIG. 16 is a schematic structural diagram of an SMF node according to an embodiment of this application.

When the processing unit 1502 is a processor, the communications unit 1503 is a communications interface, and the storage unit 1501 is a memory, the apparatus 1500 in this embodiment of the present disclosure may be an SMF node shown in FIG. 16.

As shown in FIG. 16, the SMF node 1600 includes a processor 1602, a communications interface 1603, and a memory 1601. Optionally, the SMF node 1600 may further include a bus 1604. The communications interface 1603, the processor 1602, and the memory 1601 may be connected to each other by using the bus 1604. The bus 1604 may be a peripheral component interconnect (PCI) bus, an extended industry standard architecture (EISA) bus, or the like. The bus 1604 may be classified into an address bus, a data bus, a control bus, and the like. For ease of indication, the bus is indicated by using only one bold line in FIG. 16. However, it does not indicate that there is only one bus or only one type of bus.

Figure 17:
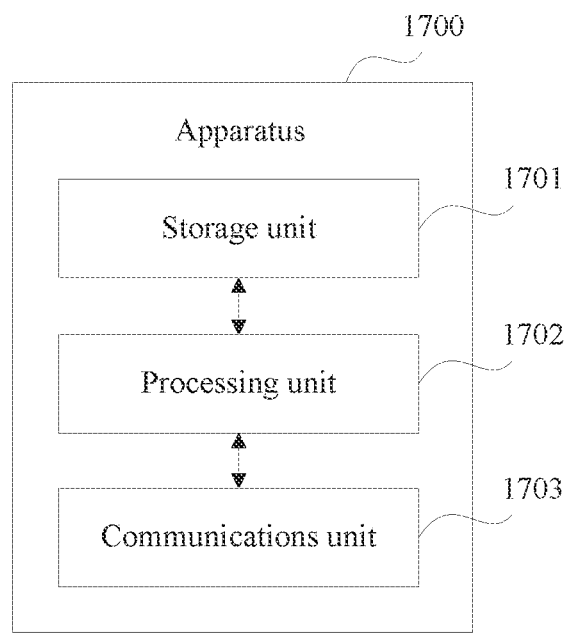
FIG. 17 is a schematic block diagram of another apparatus according to an embodiment of this application.

When an integrated unit is used, FIG. 17 is a schematic block diagram of still another apparatus according to an embodiment of the present disclosure. The apparatus 1700 may exist in a form of software, or may be a terminal, or may be a chip in a terminal. The apparatus 1700 includes a processing unit 1702 and a communications unit 1703. The processing unit 1702 is configured to control and manage an action of the apparatus 1700. For example, the processing unit 1702 is configured to support the apparatus 1700 in performing step 308 in FIG. 3B, step 608 in FIG. 6, step 708 in FIG. 7A, and step 809 in FIG. 8, and/or is configured to perform another process of the technology described in this specification. The communications unit 1703 is configured to support communication between the apparatus 1700 and another network entity (for example, an access network device). The apparatus 1700 may further include a storage unit 1701, configured to store program code and data of the apparatus 1700.

The processing unit 1702 may be a processor or a controller, for example, a CPU, a general-purpose processor, a DSP, an ASIC, an FPGA or another programmable logic device, a transistor logic device, a hardware component, or any combination thereof. The processing unit 1702 can implement or execute various example logical blocks, modules, and circuits that are described with reference to the content disclosed in the present disclosure. Alternatively, the processor may be a combination for implementing a computing function, for example, a combination of one or more microprocessors or a combination of a DSP and a microprocessor. The communications unit 1703 may be a transceiver, a transceiver circuit, a communications interface, or the like. The storage unit 1701 may be a memory.

Figure 18:
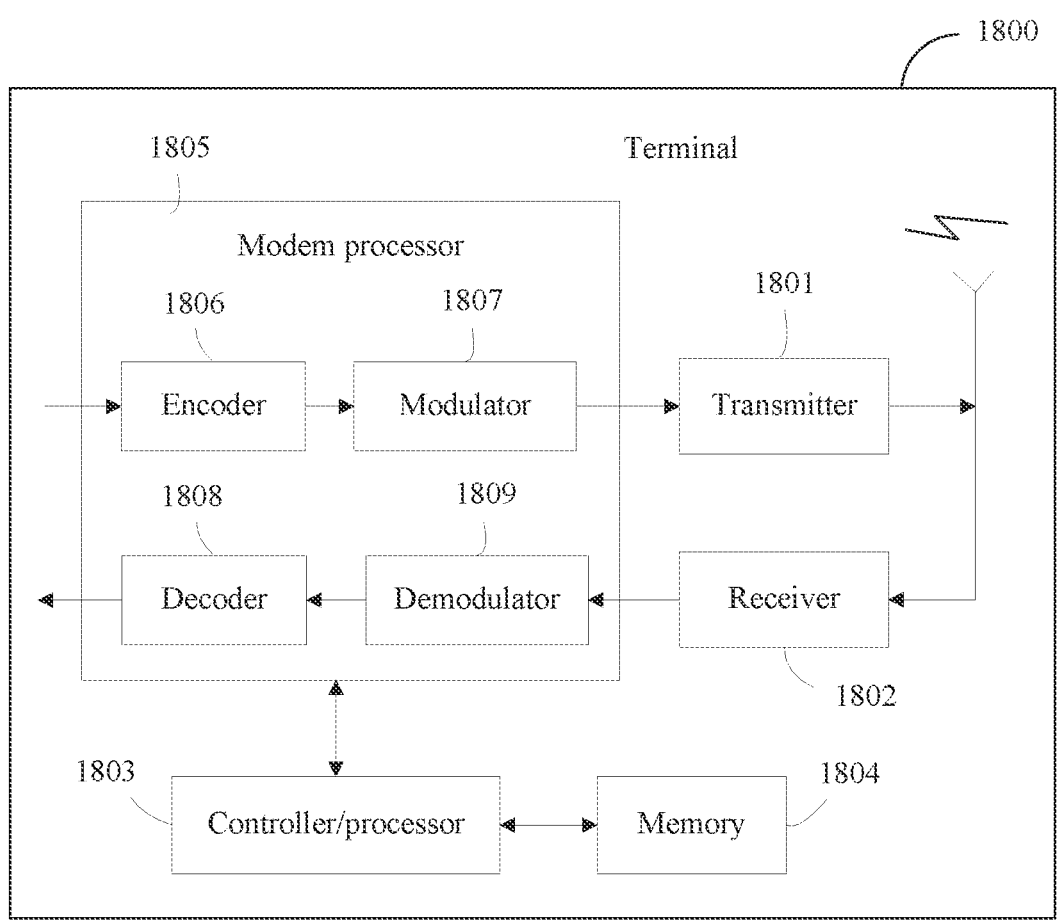
FIG. 18 is a schematic structural diagram of a terminal according to an embodiment of this application.

When the processing unit 1702 is a processor, the communications unit 1703 is a transceiver, and the storage unit 1701 is a memory, the terminal in this embodiment of the present disclosure may be a terminal shown in FIG. 18.

FIG. 18 is a simplified schematic diagram of a possible design structure of a terminal in an embodiment of the present disclosure. The terminal 1800 includes a transmitter 1801, a receiver 1802, and a processor 1803. The processor 1803 may also be a controller, and is indicated as a "controller/processor 1803" in FIG. 18. Optionally, the terminal 1800 may further include a modem processor 1805, and the modem processor 1805 may include an encoder 1806, a modulator 1807, a decoder 1808, and a demodulator 1809.

In an example, the transmitter 1801 adjusts (for example, performs analog conversion, filtering, amplification, and up-conversion) an output sample and generates an uplink signal. The uplink signal is transmitted to the base station in the foregoing embodiments by using an antenna. On a downlink, the antenna receives a downlink signal transmitted by the base station in the foregoing embodiments. The receiver 1802 adjusts (for example, performs filtering, amplification, down-conversion, and digitization) a signal received from the antenna and provides an input sample. In the modem processor 1805, the encoder 1807 receives service data and a signaling message that are to be sent on an uplink, and processes (for example, performs formatting, encoding, and interleaving) the service data and the signaling message. The modulator 1807 further processes (for example, performs symbol mapping and modulation) encoded service data and an encoded signaling message, and provides an output sample. The demodulator 1809 processes (for example, performs demodulation) the input sample and provides symbol estimation. The decoder 1808 processes (for example, performs de-interleaving and decoding) the symbol estimation and provides data and a signaling message that are decoded and sent to the terminal 1800. The encoder 1807, the modulator 1807, the demodulator 1809, and the decoder 1808 may be implemented by the integrated modem processor 1805. The units perform processing based on a radio access technology (for example, access technologies of LTE and another evolved system) used in a radio access network. It should be noted that when the terminal 1800 does not include the modem processor 1805, the foregoing functions of the modem processor 1805 may be implemented by the processor 1803.

The processor 1803 controls and manages an action of the terminal 1800, and is configured to perform processing processes performed by the terminal 1800 in the foregoing embodiments of the present disclosure. For example, the processor 1803 is further configured to perform the processing processes of the terminal in the methods shown FIG. 3A to FIG. 6 and/or another process of the technical solutions described in this application.

Further, the terminal 1800 may include a memory 1804, and the memory 1804 is configured to store program code and data used for the terminal 1800.

The methods or algorithm steps described with reference to the content disclosed in this application may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. An example storage medium is coupled to the processor, so that the processor can read information from the storage medium, and can write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network devices. Some or all of the units may be selected based on actual needs to achieve the objectives of the solutions of the embodiments.

In addition, functional units in the embodiments of the present disclosure may be integrated into one processing unit, or each of the functional units may exist alone, or two or more units are integrated into one unit. The integrated unit may be implemented in a form of hardware, or may be implemented in a form of hardware in addition to a software functional unit.

Based on the foregoing descriptions of the implementations, a person skilled in the art may clearly understand that this application may be implemented by software in addition to necessary universal hardware or certainly by hardware only. In most circumstances, the former is a preferred implementation. Based on such an understanding, the technical solutions of this application essentially or the part contributing to the prior art may be implemented in a form of a software product. The computer software product is stored in a readable storage medium, such as a floppy disk, a hard disk, or an optical disc of a computer, and includes several instructions for instructing a computer device (which may be a personal computer, a server, a network device, or the like) to perform the methods described in the embodiments of this application.

The foregoing descriptions are merely specific implementations of this application, but are not intended to limit the protection scope of this application. Any variation or replacement disclosed in this application shall fall within the protection scope of this application. Therefore, the protection scope of this application shall be subject to the protection scope of the claims.

The invention claimed is:

1. A security protection method, comprising:
   receiving, by a target access network device from a source access network device, a first security policy of a session, wherein the first security policy indicates whether to activate a user plane security protection for the session or not;
   using, by the target access network device, the first security policy on the session;
   sending, by the target access network device, the first security policy of the session to a core network node;
   receiving, by the target access network device, a second security policy of the session from the core network node, wherein the second security policy, indicating whether to activate a user plane security protection for the session or not, is different from the first security policy; and
   updating, by the target access network device, the first security policy with the second security policy for the session.

2. The method according to claim 1, the using the first security policy on the session comprises:
   activating, by the target access network device, a first user plane security protection for the session based on the first security policy indicates to activate the user plane security protection.

3. The method according to claim 2, further comprising:
   deactivating, by the target access network device, the first user plane security protection for the session based on the second security policy indicates not to activate a user plane security protection for the session.

4. The method according to claim 2, wherein the activating the first user plane security protection comprises:
   determining, by the target access network device, a first user plane protection algorithm for the session; and
   generating, by the target access network device, a first user plane protection key according to the first user plane protection algorithm.

5. The method according to claim 4, wherein the determining the first user plane protection algorithm comprises:
   determining, by the target access network device, a determined signaling plane protection algorithm as the first user plane protection algorithm.

6. The method according to claim 1, the using the first security policy on the session comprises:
   forgoing activating, by the target access network device, a first user plane security protection for the session based on the first security policy indicates not to activate the user plane security protection.

7. The method according to claim 6, further comprising:
   activating, by the target access network device, the first user plane security protection for the session based on the second security policy indicates to activate a user plane security protection for the session.

8. The method according to claim 1, wherein the receiving the first security policy of the session comprises:
   receiving, by the target access network device, a handover request message from the source access network device, wherein handover request message comprises the first security policy and information of the session.

9. The method according to claim 1, wherein the core network node is an access and mobility management function (AMF) node or a session management function (SMF) node.

10. A security protection method, comprising:
    receiving, by a core network node, a first security policy of a session from a first access network device, wherein the first security policy indicates whether to activate a user plane security protection for the session;
    determining by the core network node, whether the first security policy is same as a second security policy stored in the core network node that corresponds to the session; and
    sending, by the core network node, the second security policy to the first access network device in case that the first security policy is different from the second security policy.

11. The method according to claim 10, wherein the determining whether the first security policy is same as a second security policy stored in the core network node that corresponds to the session comprises:
    determining, by the core network node, that the first security policy is different from the second security policy in case that the first security policy indicates not to activate a user plane security protection for the session and the second security policy indicates to activate a user plane security protection for the session.

12. The method according to claim 10, wherein the determining whether the first security policy is same as a second security policy stored in the core network node that corresponds to the session comprises:
    determining, by the core network node, that the first security policy is different from the second security policy in case that that the first security policy indicates to activate a user plane security protection for the session and the second security policy indicates not to activate a user plane security protection for the session.

13. The method according to claim 10, wherein the core network node is a session management function node, and
    the receiving the first security policy of the session from the first access network device comprises:
    receiving, by the session management function node via an access and mobility management function node, the first security policy of the session from the first access network device;
    the sending the second security policy to the first access network device comprises:
    sending, by the session management function node via the access and mobility management function node the second security policy to the first access network device.

14. An apparatus comprising:
    at least one processor; and
    a memory coupled to the at least one processor and having program instructions stored thereon which, when executed by the at least one processor, cause the apparatus to:
    receive, from a source access network device, a first security policy of a session, wherein the first security policy indicates whether to activate a user plane security protection for the session or not;
    use the first security policy on the session;
    send the first security policy to a core network node;

receive a second security policy of the session from the core network node, wherein the second security policy, indicating whether to activate a user plane security protection for the session or not, is different from the first security policy; and update the first security policy with the second security policy for the session.

15. The apparatus according to claim 14, wherein using the first security policy on the session comprises:

activating a first user plane security protection for the session based on the first security policy indicates to activate the user plane security protection.

16. The apparatus according to claim 15, wherein the instructions, when executed by the processor, further cause the apparatus to:

deactivate the first user plane security protection for the session based on the second security policy indicates not to activate a user plane security protection for the session.

17. The apparatus according to claim 15, wherein the activating the first user plane security protection comprises:

determining a first user plane protection algorithm for the session; and generating a first user plane protection key according to the first user plane protection algorithm.

18. The apparatus according to claim 17, wherein the determining the first user plane protection algorithm comprises:

determining a determined signaling plane protection algorithm as the first user plane protection algorithm.

19. The apparatus according to claim 14, the using the first security policy on the session comprises:

forgoing activating a first user plane security protection for the session based on the first security policy indicates not to activate the user plane security protection.

20. The apparatus according to claim 19, wherein the instructions, when executed by the processor, further cause the apparatus to:

activate the first user plane security protection for the session based on the second security policy indicates to activate a user plane security protection for the session.

21. The apparatus according to claim 14, wherein the receiving the first security policy of the session comprises:

receiving a handover request message from the source access network device, wherein handover request message comprises the first security policy and information of the session.

22. The apparatus according to claim 14, wherein the core network node is an access and mobility management function node or a session management function node.

23. A core network node comprising:
at least one processor; and a memory coupled to the at least one processor and having program instructions stored thereon which, when executed by the at least one processor, cause the core network node to:

receive a first security policy of a session from a first access network device, wherein the first security policy indicates whether to activate a user plane security protection for the session;

determine whether the first security policy received from the first access network device is same as a second security policy stored in the core network node that corresponds to the session; and send the second security policy to the first access network device in case that the first security policy received from the first access network device is different from the second security policy stored in core network node.

24. The apparatus according to claim 23, wherein the first security policy is from a second access network device during a handover procedure of a terminal device from the second access network device to the first access network device.

25. The apparatus according to claim 23, the instructions, when executed by the processor, further cause the apparatus to:

determine that the first security policy is different from the second security policy in case that the first security policy indicates not to activate a user plane security protection for the session and the second security policy indicates to activate a user plane security protection for the session.

26. The apparatus according to claim 23, the instructions, when executed by the processor, further cause the apparatus to:

determine that the first security policy is different from the second security policy in case that that the first security policy indicates to activate a user plane security protection for the session and the second security policy indicates not to activate a user plane security protection for the session.

27. The apparatus according to claim 23, wherein the core network node is a session management function node, and the receiving the first security policy of the session from the first access network device comprises:

receiving, via a access and mobility management function node, the first security policy of the session from the first access network device;

the sending the second security policy to the first access network device comprises:

sending, via the access and mobility management function node the second security policy to the first access network device.

* * * * *

UNITED STATES PATENT AND TRADEMARK OFFICE
CERTIFICATE OF CORRECTION

| | |
|---|---|
| PATENT NO. | : 11,589,274 B2 |
| APPLICATION NO. | : 17/190740 |
| DATED | : February 21, 2023 |
| INVENTOR(S) | : He Li and Jing Chen |

It is certified that error appears in the above-identified patent and that said Letters Patent is hereby corrected as shown below:

In the Claims

In Column 48, In Line 38, In Claim 12, delete "that that" and insert -- that --.

In Column 50, In Line 35 (approx.), In Claim 26, delete "that that" and insert -- that --.

Signed and Sealed this
Thirteenth Day of June, 2023

Katherine Kelly Vidal
*Director of the United States Patent and Trademark Office*